US012810773B2

(12) United States Patent
Kim

(10) Patent No.: US 12,810,773 B2
(45) Date of Patent: Nov. 24, 2026

(54) PIXEL CIRCUIT AND DISPLAY DEVICE INCLUDING THE SAME

(71) Applicant: Samsung Display Co., Ltd., Yongin-si (KR)

(72) Inventor: Keunwoo Kim, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 384 days.

(21) Appl. No.: 18/526,869

(22) Filed: Dec. 1, 2023

(65) Prior Publication Data

US 2024/0105113 A1 Mar. 28, 2024

Related U.S. Application Data

(62) Division of application No. 17/669,887, filed on Feb. 11, 2022, now Pat. No. 11,869,414.

(30) Foreign Application Priority Data

Apr. 29, 2021 (KR) ........................ 10-2021-0055650

(51) Int. Cl.
*G09G 3/32* (2016.01)

(52) U.S. Cl.
CPC ....... *G09G 3/32* (2013.01); *G09G 2310/0256* (2013.01); *G09G 2320/0257* (2013.01); *G09G 2320/043* (2013.01)

(58) Field of Classification Search
CPC ............. G09G 3/32; G09G 2310/0256; G09G 2320/0257; G09G 2320/043; G09G 2300/0426; G09G 3/3233; G09G 2300/0819
See application file for complete search history.

(56) References Cited

U.S. PATENT DOCUMENTS 11,380,263 B2 7/2022 Yoon et al.
2011/0273419 A1* 11/2011 Park .................... G09G 3/3233 345/76

(Continued)

FOREIGN PATENT DOCUMENTS

CN 111063307 A 4/2020
CN 112313733 A 2/2021

(Continued)

OTHER PUBLICATIONS

Sze Semiconductor Devices. Physics and Technology. 2nd Edition, p. 195 (Year: 2001).*

(Continued)

*Primary Examiner* — Galina G Yushina
(74) *Attorney, Agent, or Firm* — CANTOR COLBURN LLP

(57) ABSTRACT

A pixel circuit includes: a first transistor including a first gate terminal, a first source terminal electrically connected to a first node, a first drain terminal electrically connected to a light emitting diode, and a back-gate terminal, where a first voltage which decreases over time is applied to the back-gate terminal; and a second transistor including a second gate terminal which receives a gate signal, a second source terminal which receives a data voltage, and a second drain terminal electrically connected to the first node.

6 Claims, 17 Drawing Sheets

(56) References Cited

U.S. PATENT DOCUMENTS

| | | | | |
|---|---|---|---|---|
| 2014/0002160 | A1* | 1/2014 | Priel | H03K 19/00346 327/198 |
| 2016/0104424 | A1 | 4/2016 | Lim et al. | |
| 2018/0082647 | A1 | 3/2018 | Nie | |
| 2018/0268757 | A1* | 9/2018 | Chen | G09G 3/3266 |
| 2020/0126485 | A1 | 4/2020 | Moon et al. | |
| 2020/0243017 | A1* | 7/2020 | Lee | G09G 3/3233 |
| 2020/0402464 | A1* | 12/2020 | Seo | G09G 3/3233 |
| 2021/0027719 | A1* | 1/2021 | Cho | G09G 3/3291 |
| 2021/0043139 | A1* | 2/2021 | Cha | G09G 3/3233 |
| 2021/0090502 | A1 | 3/2021 | Choi et al. | |
| 2021/0167096 | A1* | 6/2021 | Miyake | H10D 86/481 |
| 2021/0272521 | A1* | 9/2021 | Yoon | H10K 59/124 |
| 2022/0215793 | A1 | 7/2022 | Han et al. | |
| 2022/0415273 | A1* | 12/2022 | Chen | G09G 3/3611 |

FOREIGN PATENT DOCUMENTS

| | | | | |
|---|---|---|---|---|
| CN | 112349236 | A | 2/2021 | |
| CN | 112634830 | A | 4/2021 | |
| EP | 3813053 | A1 | 4/2021 | |
| JP | 2009063607 | * | 3/2009 | G09G 3/30 |
| KR | 1020200017021 | A | 2/2020 | |
| KR | 1020200043568 | A | 4/2020 | |

OTHER PUBLICATIONS

Extended European Search Report for Application No. 22166164.8-1210 dated Sep. 16, 2022 in the Extended European Search Report.

* cited by examiner

PIXEL CIRCUIT AND DISPLAY DEVICE INCLUDING THE SAME

This application is a divisional of U.S. patent application Ser. No. 17/669,887, filed on Feb. 11, 2022, which claims priority to Korean Patent Application No. 10-2021-0055650 filed on Apr. 29, 2021, and all the benefits accruing therefrom under 35 U.S.C. § 119, the content of which in its entirety is herein incorporated by reference.

BACKGROUND

1. Field

Embodiments relate to a pixel circuit and a display device including the same.

2. Description of the Related Art

A display device is a device that displays an image for providing visual information to a user. A light emitting diode included in the display device may deteriorate over time. When the light emitting diode is deteriorated, the life span of the light emitting diode may be reduced. Accordingly, a display quality of the display device may be deteriorated.

SUMMARY

Embodiments provide a pixel circuit with improved life span of a light emitting diode.

Other embodiments provide a display device including the pixel circuit.

A pixel circuit according to an embodiment includes: a first transistor including a first gate terminal, a first source terminal electrically connected to a first node, a first drain terminal electrically connected to a light emitting diode, and a back-gate terminal, where a first voltage which decreases over time is applied to the back-gate terminal; and a second transistor including a second gate terminal which receives a gate signal, a second source terminal which receives a data voltage, and a second drain terminal electrically connected to the first node.

In an embodiment, a driving range of the first transistor may increase over time.

In an embodiment, the back-gate terminal may be electrically connected to a global transistor, and the global transistor may include a global gate terminal which receives a second voltage which has a negative polarity, a global source terminal which receives a third voltage which has a positive polarity, and a global drain terminal electrically connected to the back-gate terminal.

In an embodiment, the global drain terminal may provide the first voltage to the back-gate terminal.

In an embodiment, the pixel circuit may further include: a light emission control transistor including a light emission control gate terminal which receives a light emission driving signal, a light emission control source terminal which receives a high power voltage, and a light emission control drain terminal electrically connected to the first node, and the third voltage may be the high power voltage.

In an embodiment, a terminal of the light emitting diode may receive a low power voltage, and the second voltage may be the low power voltage.

In an embodiment, the pixel circuit may further include: an initialization transistor including an initialization gate terminal which receives an initialization gate signal, an initialization source terminal electrically connected to the gate terminal of the first transistor, and an initialization drain terminal which receives a transistor initialization voltage, and the second voltage may be the transistor initialization voltage.

In an embodiment, the pixel circuit may further include: an anode initialization transistor including an anode initialization gate terminal which receives a bypass gate signal, an anode initialization source terminal electrically connected to the light emitting diode, and an anode initialization drain terminal which receives an anode initialization voltage, and the second voltage may be the anode initialization voltage.

A display device according to an embodiment includes: a plurality of pixel circuits arranged in a plurality of rows and a plurality of columns; a gate driving circuit which applies a gate signal to the pixel circuits; a data driving circuit which applies a data voltage to the pixel circuits; and a control circuit which controls the gate driving circuit and the data driving circuit. Each of the pixel circuits includes: a first transistor including a first gate terminal, a first source terminal electrically connected to a first node, a first drain terminal electrically connected to a light emitting diode, and a back-gate terminal which receives a first voltage which decreases over time; and a second transistor including a second gate terminal which receives a gate signal, a second source terminal applied a data voltage, and a second drain terminal electrically connected to the first node.

In an embodiment, a driving range of the first transistor may increase over time.

In an embodiment, the display device may further include a plurality of global transistors. Each of the global transistors may include: a global gate terminal which receives a second voltage which has a negative polarity, a global source terminal which receives a third voltage which has a positive polarity, and a global drain terminal electrically connected to the back-gate terminal, and the each of the global transistors may be electrically connected to the pixel circuits which correspond to at least one column among the plurality of columns.

In an embodiment, the global drain terminal may provide the first voltage to the back-gate terminal.

A display device according to an embodiment includes: a substrate; a driving transistor including an active pattern disposed on the substrate and including a channel region, a gate electrode disposed on the active pattern and overlapping the channel region in a plan view, and a back-gate pattern disposed under the active pattern and overlapping the active pattern in the plan view; and a global transistor which provides a first voltage which decreases over time to the back-gate pattern.

In an embodiment, the global transistor may include: a global active pattern including a global source region electrically connected to a voltage supply line which provides a third voltage which has a positive polarity, a global drain region electrically connected to the back-gate pattern, and a global channel region disposed between the global source region and the global drain region; and a global gate electrode disposed on the global active pattern, and which overlaps the global channel region in the plan view, and receives a second voltage which has a negative polarity.

In an embodiment, the voltage supply line may be a high power voltage line.

In an embodiment, the display device may further include: a light emitting diode electrically connected to the driving transistor and which receives a low power voltage, and the second voltage may be the low power voltage.

In an embodiment, the display device may further include: an initialization transistor including an initialization gate terminal which receives an initialization gate signal, an initialization source terminal electrically connected to the gate electrode of the driving transistor, and an initialization drain terminal which receives a transistor initialization voltage, and the second voltage may be the transistor initialization voltage.

In an embodiment, the display device may further include: a light emitting diode electrically connected to the driving transistor; and an anode initialization transistor including an anode initialization gate terminal which receives a bypass gate signal, an anode initialization source terminal electrically connected to the light emitting diode, and an anode initialization drain terminal which receives an anode initialization voltage, and the second voltage may be the anode initialization voltage.

In a display device according to embodiments of the present invention, a first voltage which decreases over time may be applied to a back-gate terminal of a first transistor included in the display device. Accordingly, a driving range (DR-range) of the first transistor may be increased. When the driving range is increased, a life span of the light emitting diode may be improved. Also, accordingly, a resolution of the display device may be increased, and a display quality of the display device may be effectively improved.

BRIEF DESCRIPTION OF THE DRAWINGS

FIG. 13 is a graph for explaining a change of a driving range regarding a driving current of a first transistor according to a first voltage applied to a back-gate terminal of the first transistor.

DETAILED DESCRIPTION

Figure 1:
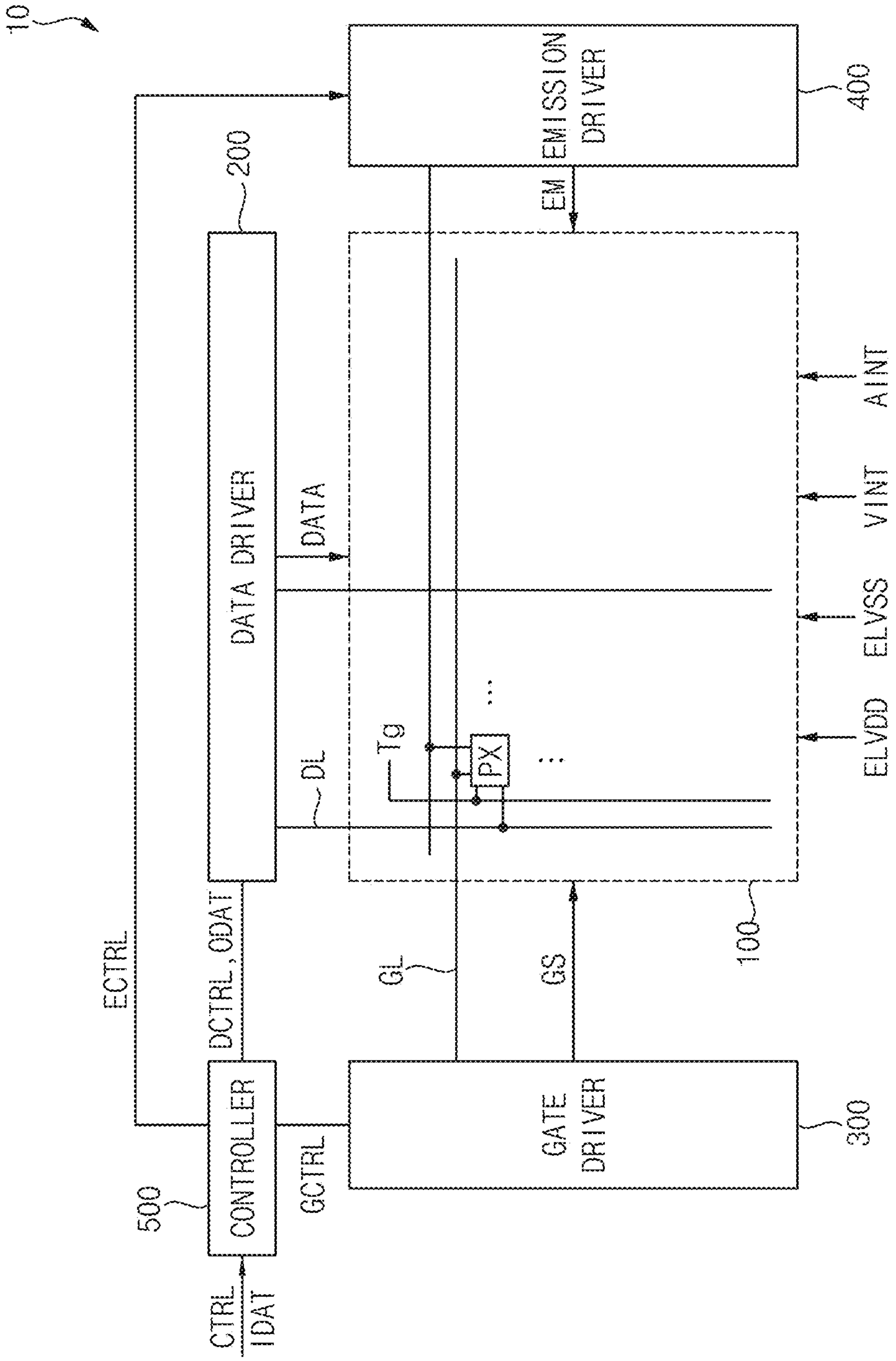
FIG. 1 is a block diagram illustrating a display device according to an embodiment.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Hereinafter, display devices in accordance with embodiments will be described in more detail with reference to the accompanying drawings. The same reference numerals are used for the same components in the drawings, and redundant descriptions of the same components will be omitted.

FIG. 1 is a block diagram illustrating a display device according to an embodiment. Referring to FIG. 1, the display device 10 may include a pixel unit 100, a data driving circuit 200, a gate driving circuit 300, a light emission driving circuit 400, and a controller 500.

The pixel unit 100 may include a plurality of pixels PX and a global transistor Tg. Each of the pixels PX may emit light having a preset color. The pixel unit 100 may have an RGBG pixel structure (arrangement of red pixel, green pixel, blue pixel, and green pixels), and each of the pixels PX may emit red, green, or blue light. Each of the pixels PX may include a pixel circuit (e.g., the pixel circuit PXC of FIG. 2) and a light emitting diode (e.g., the light emitting diode LD of FIG. 2. Each of the pixels PX may be driven through the pixel circuit. The pixels PX may be electrically connected to the global transistor Tg.

The data driving circuit 200 may be implemented as one or more integrated circuits ("IC"). In another embodiment, the data driving circuit 200 may be mounted on the pixel unit or integrated in a peripheral portion of the pixel unit 100.

The data driving circuit 200 may generate a data voltage DATA based on an output image data ODAT and an data control signal DCTRL. For example, the data driving circuit may generate the data voltage DATA corresponding to the output image data ODAT and output the data voltage DATA in response to the data control signal DCTRL. The data driving circuit 200 may output the data voltage DATA through a data line DL. For example, the data driving circuit 200 may output the data voltage DATA to the pixels PX through the data line DL.

The output image data ODAT may be RGB data for an image displayed in the pixel unit 100, and the data control signal DCTRL may include an output data enable signal, a horizontal start signal, and a load signal.

The gate driving circuit 300 may generate a gate signal GS based on a gate control signal GCTRL. The gate signal GS may be a clock signal. The gate signal GS may include a turn-on voltage that turns on a transistor and a turn-off voltage that turns off the transistor. The gate driving circuit 300 may sequentially output the gate signal GS through a gate line GL. For example, the gate driving circuit 300 may output the gate signal GS to the pixels PX through the gate line GL. The gate control signal GCTRL may include a vertical start signal, a clock signal, etc. In an embodiment, the gate driving circuit 300 may be mounted on the pixel unit 100 or integrated in a peripheral portion of the pixel unit 100. In another embodiment, the gate driving circuit 300 may be implemented as one or more integrated circuits.

The light emission driving circuit 400 may generate a light emission driving signal EM based on a light emission control signal ECTRL. The light emission driving signal EM may be a clock signal and may include the turn-on voltage and the turn-off voltage. The light emission driving circuit 400 may sequentially output the light emission driving signal EM. The light emission control signal ECTRL may include a vertical start signal, a clock signal, etc. In an embodiment, the light emission driving circuit 400 may be mounted on the pixel unit 100 or integrated in a peripheral portion of the pixel unit 100. In another embodiment, the light emission driving circuit 400 may be implemented as one or more integrated circuits.

The controller 500 (e.g., timing controller ("T-CON")) may receive an input image data IDAT and a control signal CTRL from an external host processor (e.g., GPU). For example, the input image data IDAT may be RGB data including red image data, green image data, and blue image data. The controller 500 may generate the gate control signal GCTRL, the data control signal DCTRL, and the output image data ODAT based on the input image data IDAT and the control signal CTRL.

A high power voltage ELVDD may be applied to the pixel unit 100. The high power voltage ELVDD may be applied to the pixel unit 100 through a high power voltage line. A low power voltage ELVSS may be applied to the pixel unit 100. The low power voltage ELVSS may be applied to the pixel unit 100 through a common electrode. A transistor initialization voltage VINT and an anode initialization voltage AINT may be applied to the pixel unit 100. A value of the high power voltage ELVDD is greater than a value of the low power voltage ELVSS.

Figure 2:
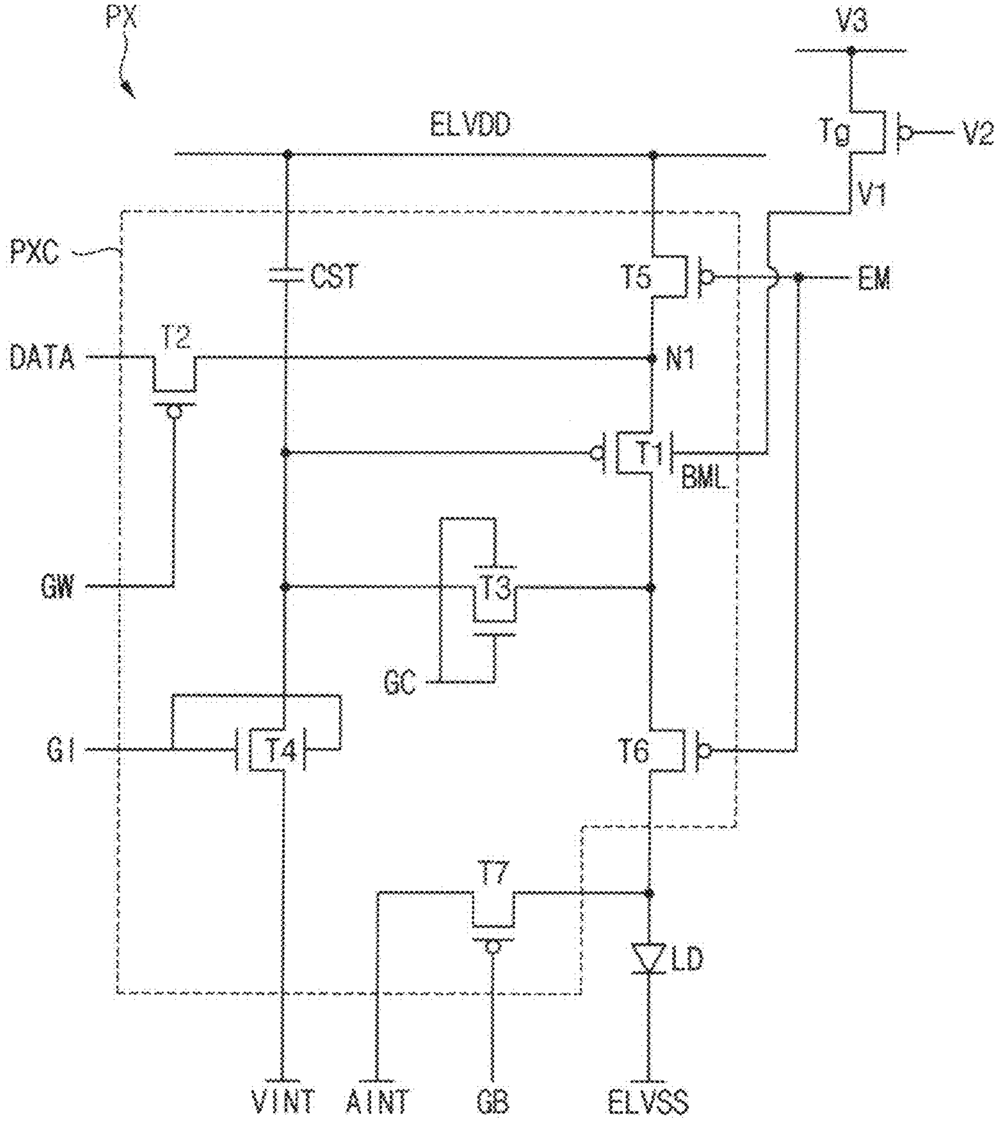
FIG. 2 is a circuit diagram illustrating an example of a pixel and a global transistor included in the display device of FIG. 1.

FIG. 2 is a circuit diagram illustrating an example of a pixel and a global transistor included in the display device of FIG. 1.

Referring to FIGS. 1 and 2, the pixel PX may be driven through the pixel circuit PXC. The pixel PX may include the pixel circuit PXC and a light emitting diode LD. The pixel circuit PXC may include a plurality of transistors and at least one capacitor. The pixel circuit PXC may be electrically connected to the global transistor Tg.

In an embodiment, the pixel circuit PXC may include a first transistor T1, a second transistor T2, a third transistor T3, a fourth transistor T4, a fifth transistor T5, a sixth transistor T6, a seventh transistor T7, and a storage capacitor CST.

The first transistor T1 may include a first gate terminal, a first source terminal, a first drain terminal, and a back-gate terminal BML. The first source terminal of the first transistor T1 may be electrically connected to a first node N1. The first source terminal of the first transistor T1 may receive the data voltage DATA via the second transistor T2. The first drain terminal of the first transistor T1 may be electrically connected to the light emitting diode LD through the sixth transistor T6. The first transistor T1 may generate a driving current. For example, the first transistor T1 may be referred to as a driving transistor.

The back-gate terminal BML of the first transistor T1 may be electrically connected to the global transistor Tg. The back-gate terminal BML may receive a first voltage V1 from the global transistor Tg.

The second transistor T2 may include a second gate terminal, a second source terminal, and a second drain terminal. The second gate terminal of the second transistor T2 may receive a first gate signal GW through the gate line GL. For example, the first gate signal GW may be referred to as a write gate signal GW. The second source terminal of the second transistor T2 may receive the data voltage DATA through the data line DL. While the second transistor T2 is turned on, the second drain terminal of the second transistor T2 may provide the data voltage DATA to the first node N1.

The second transistor T2 may be turned on or off in response to the first gate signal GW. For example, when the second transistor T2 is a PMOS transistor, the second transistor T2 may be turned off when the first gate signal GW has a positive voltage level, and turned on when the first gate signal GW has a negative voltage level. For example, the second transistor T2 may be referred to as a switching transistor.

The third transistor T3 may include a third gate terminal, a third back-gate terminal, a third source terminal, and a third drain terminal. The third gate terminal and the third back-gate terminal of the third transistor T3 may receive a second gate signal GC. For example, the second gate signal GC may be referred to as a compensation control signal GC. As the third transistor T3 has a dual-gate structure, reliability of the third transistor T3 may be effectively improved.

The third transistor T3 may be turned on or off in response to the second gate signal GC. For example, when the third transistor T3 is an NMOS transistor, the third transistor T3 may be turned on when the second gate signal GC has a positive voltage level, and turned off when the second gate signal GC has a negative voltage level. While the third transistor T3 is turned on in response to the second gate signal GC, the third transistor T3 may diode-connect the first transistor T1. Accordingly, the third transistor T3 may compensate for a threshold voltage of the first transistor T1. For example, the third transistor T3 may be referred to as a compensation transistor.

The fourth transistor T4 may include a fourth gate terminal, a fourth back-gate terminal, a fourth source terminal, and a fourth drain terminal. The fourth gate terminal and the fourth back-gate terminal of the fourth transistor T4 may receive a third gate signal GI. For example, the third gate signal GI may be referred to as an initialization gate signal GI. As the fourth transistor T4 has a dual-gate structure, reliability of the fourth transistor T4 may be effectively improved. The fourth source drain terminal of the fourth transistor T4 may be connected to the first gate terminal of the first transistor T1. The fourth source terminal of the fourth transistor T4 may be connected to a line for supplying the transistor initialization voltage VINT. The fourth transistor T4 may connect the first gate terminal of the first transistor T1 and the line for supplying the transistor initialization voltage VINT.

The fourth transistor T4 may be turned on or off in response to the third gate signal GI. For example, when the fourth transistor T4 is an NMOS transistor, the fourth transistor T4 may be turned on when the third gate signal GI has a positive voltage level, and turned off when the third gate signal GI has a negative voltage level.

While the fourth transistor T4 is turned on in response to the third gate signal GI, the first gate terminal of the first transistor T1 may be electrically connected to the line for supplying the transistor initialization voltage VINT. Accordingly, the fourth transistor T4 may transmit the transistor initialization voltage VINT to the first gate terminal of the first transistor T1 in response to the third gate signal GI. For example, the fourth transistor T4 may be referred to as an initialization transistor.

The fifth transistor T5 may include a fifth gate terminal, a fifth source terminal, and a fifth drain terminal. The fifth gate terminal of the fifth transistor T5 may receive the light emission driving signal EM. The fifth source terminal of the fifth transistor T5 may receive the high power voltage ELVDD. The fifth drain terminal of the fifth transistor T5 may be connected to the first node N1. When the fifth transistor T5 is turned on in response to the light emission driving signal EM, the fifth transistor T5 may provide the high power voltage ELVDD to the first transistor T1.

The sixth transistor T6 may include a sixth gate terminal, a sixth source terminal, and a sixth drain terminal. The sixth gate terminal of the sixth transistor T6 may receive the light emission driving signal EM. The sixth source terminal of the sixth transistor T6 may be connected to the first transistor T1. The sixth drain terminal of the sixth transistor T6 may be connected to the light emitting diode LD. When the sixth transistor T6 is turned on in response to the light emission driving signal EM, the sixth transistor T6 may provide the driving current to the light emitting diode LD. For example, each of the fifth transistor T5 and the sixth transistor T6 may be referred to as a light emission control transistor.

The seventh transistor T7 may include a seventh gate terminal, a seventh source terminal, and a seventh drain terminal. The seventh gate terminal of the seventh transistor T7 may receive a fourth gate signal GB. For example, the fourth gate signal GB may be referred to as a bypass gate signal GB. The seventh source terminal of the seventh transistor T7 may be connected to the light emitting diode LD. The seventh drain terminal of the seventh transistor T7 may receive the anode initialization voltage AINT. When the seventh transistor T7 is turned on in response to the fourth gate signal GB, the seventh transistor T7 may provide the anode initialization voltage AINT to the light emitting diode LD. Accordingly, the seventh transistor T7 may initialize a first terminal of the light emitting diode LD by supplying the anode initialization voltage AINT. For example, the seventh transistor T7 may be referred to as an anode initialization transistor.

The storage capacitor CST may include a first terminal and a second terminal. The first terminal of the storage capacitor CST may be connected to the first transistor T1, and the second terminal of the storage capacitor CST may receive the high power voltage ELVDD. The storage capacitor CST may maintain a voltage level of the first gate terminal of the first transistor T1 during an inactivation period of the first gate signal GW.

The light emitting diode LD may include the first terminal (e.g., an anode terminal) and a second terminal (e.g., a cathode terminal). The first terminal of the light emitting diode LD may be connected to the sixth transistor T6 to receive the driving current, and the second terminal may receive the low power voltage ELVSS. The light emitting diode LD may generate light having a luminance corresponding to the driving current.

The global transistor Tg may include a global gate terminal, a global source terminal, and a global drain terminal. The global gate terminal of the global transistor Tg may receive a second voltage V2 having a negative polarity. The global source terminal of the global transistor Tg may receive a third voltage V3 having a positive polarity. The global transistor Tg may be electrically connected to the back-gate terminal BML of the first transistor T1. The global drain terminal of the global transistor Tg may provide the first voltage V1 to the back-gate terminal BML.

Since the third voltage V3 having a positive polarity is provided to the global source terminal of the global transistor Tg, and the second voltage V2 having a negative polarity is provided to the global gate terminal of the global transistor Tg, a threshold voltage of the global transistor Tg may be changed. Specifically, the threshold voltage of the global transistor Tg may decrease over time.

As the threshold voltage of the global transistor Tg decreases over time, the first voltage V1 provided to the global drain terminal of the global transistor Tg may change over time. Specifically, the first voltage V1 may decrease over time. For example, a polarity of the first voltage V1 may decrease from positive to negative.

Figure 11:
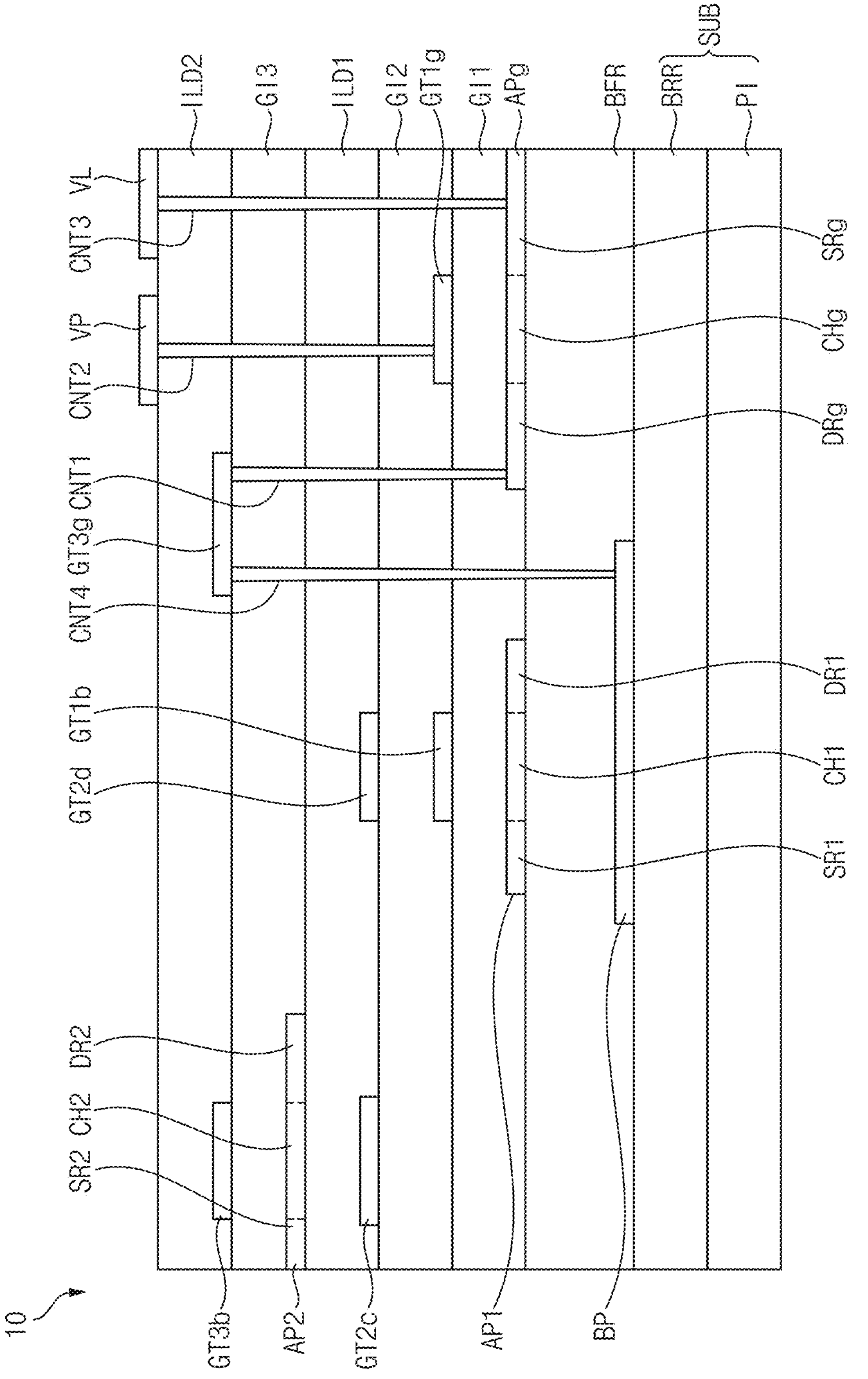
FIG. 11 is a cross-sectional view illustrating a pixel circuit and a global transistor included in the display device of FIG. 1.

FIGS. 3 to 10 are layout views for explaining a pixel circuit included in the display device of FIG. 1. FIG. 11 is a cross-sectional view illustrating a pixel circuit and a global transistor included in the display device of FIG. 1.

Figure 3:
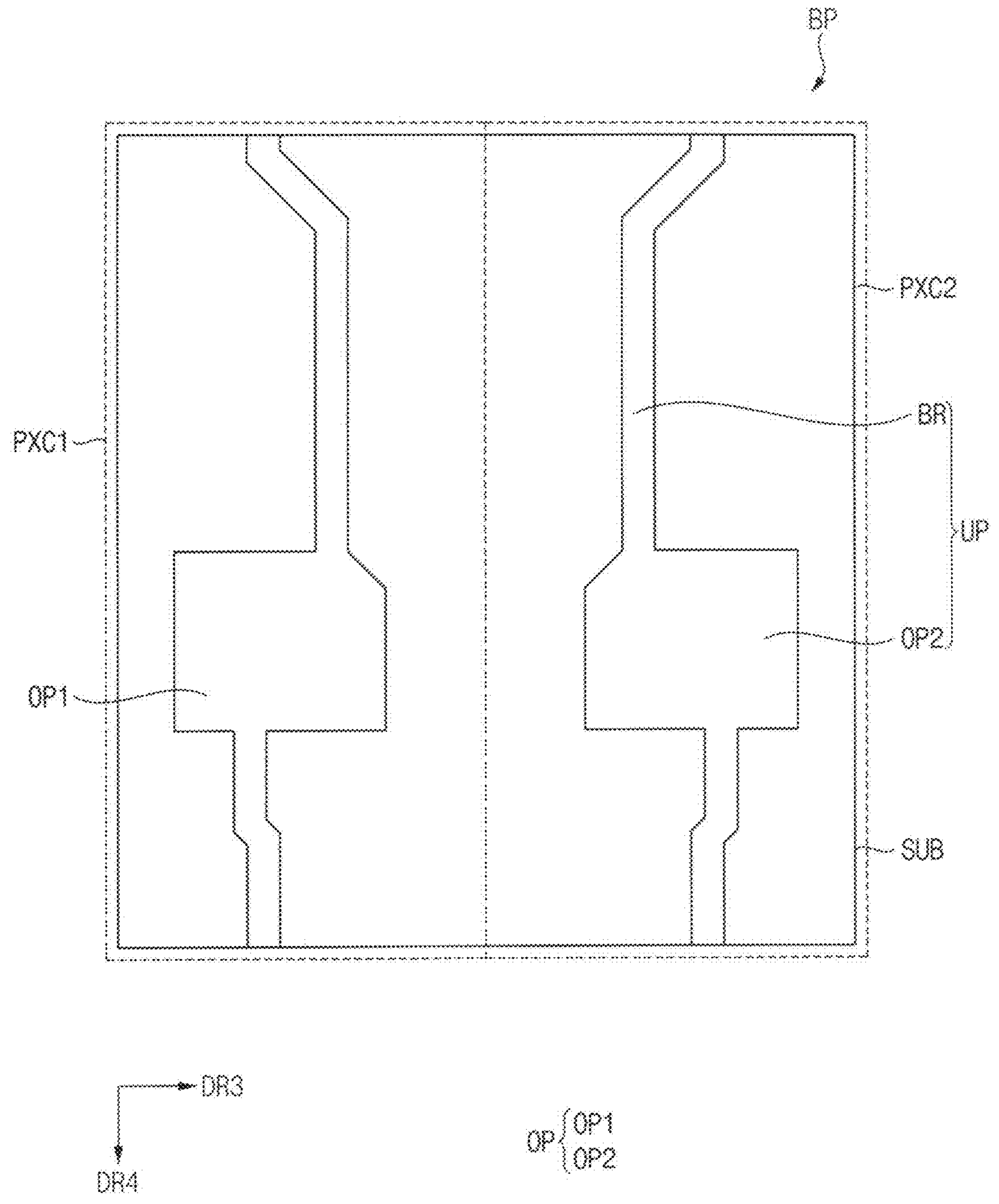
FIGS. 3 to 10 are layout views for explaining a pixel circuit included in the display device of FIG. 1.

Referring to FIGS. 2, 3, and 11, the display device 10 may include a first pixel circuit PXC1 and a second pixel circuit PXC2 adjacent to each other. For example, the second pixel circuit PXC2 may be positioned in a third direction DR3 from the first pixel circuit PXC1. The second pixel circuit PXC2 may have a symmetric structure of the first pixel circuit PXC1 based on an imaginary symmetric line. The imaginary symmetric line may be extended in a fourth direction DR4 perpendicular to the third direction DR3.

The substrate SUB may have a structure in which at least one polymer film PI and at least one barrier layer BRR are alternately stacked (See FIG. 11). For example, the polymer film PI may be formed using or include an organic material such as polyimide, and the barrier layer BRR may be formed using or include an inorganic material.

In an embodiment, the polymer film PI may include a polymer. Examples of the polymer constituting the polymer film PI may include polyethylene terephthalate, polyethylene naphthalate, polyether ketone, polycarbonate, polyarylate, polyether sulfone, polyimide, polybenzoxazole, polybenzobisoxazole, polybenzo imidazole or polybenzothiazole. These polymer may be used alone or in mixture.

The barrier layer BRR may be disposed on the polymer film PI. The barrier layer BRR may prevent metal atoms or impurities from diffusing from the polymer film PI to a first active pattern AP1. Examples of the material forming the barrier layer BRR may include silicon oxide, silicon nitride, silicon oxynitride, aluminum oxide, tantalum oxide, hafnium oxide, zirconium oxide, or titanium oxide. These material may be used alone or in mixture.

The back-gate pattern BP may be disposed on the barrier layer BRR included in the substrate SUB. The back-gate pattern BP may correspond to the back-gate terminal BML described with reference to FIG. 2.

In an embodiment, the back-gate pattern BP may be entirely disposed in the pixel unit (e.g., the pixel unit 100 of FIG. 1). The back-gate pattern BP may have a shape in which a plurality of unit patterns UP are repeatedly arranged. The back-gate pattern BP may include a plurality of overlapping patterns OP and a plurality of bridges BR.

In an embodiment, the overlapping patterns OP may have an island shape. Also, the overlapping patterns OP may include a first overlapping pattern OP1 and a second overlapping pattern OP2. The second overlapping pattern OP2 may be symmetrical to the first overlapping pattern OP1 in the third direction DR3. The first overlapping pattern OP1 and the second overlapping pattern OP2 may be alternately arranged along the third direction DR3. Also, the first overlapping pattern OP1 may be arranged side by side in the fourth direction DR4, and the second overlapping pattern OP2 may be arranged side by side in the fourth direction DR4.

In an embodiment, the bridges BR may extend in the fourth direction DR4 and connect the overlapping patterns OP to each other. For example, the bridges BR may connect the first overlapping patterns OP1 arranged side by side in the fourth direction DR4, and the bridges BR may connect the second overlapping patterns OP2 arranged side by side in the fourth direction DR4.

In an embodiment, the back-gate pattern BP may include a metal. For example, the back-gate pattern BP may include the same metal (e.g., molybdenum (Mo)) as a first gate layer GT1.

In another embodiment, the back-gate pattern BP may include a silicon semiconductor. For example, examples of the silicon semiconductor forming the back-gate pattern BP may include amorphous silicon or polycrystalline silicon. In addition, the back-gate pattern BP may be doped with a cation or an anion. For example, the cation may be a group III element, and may be boron or the like. The anion may be a group V element, and may be phosphorus.

In an embodiment, a first voltage V1 may be applied to the back-gate pattern BP. For example, the first voltage V1 that decreases over time may be provided to the back-gate pattern BP. A structure of the back-gate pattern BP will be described in more detail with reference to FIGS. 11 and 12.

The buffer layer BFR may cover the back-gate pattern BP and may be disposed on the substrate SUB. The buffer layer BFR may prevent metal atoms or impurities from diffusing from the substrate SUB to the first active pattern AP1. Examples of the material forming the buffer layer BFR may include silicon oxide, silicon nitride, or silicon oxynitride. These materials may be used alone or in mixture. The buffer layer BFR may have a single layer or multilayer structure.

The first active pattern AP1 may be disposed on the buffer layer BFR. In an embodiment, examples of material forming the first active pattern AP1 may be a silicon semiconductor amorphous silicon, polycrystalline silicon, etc. These materials may be used alone or in mixture.

The first active pattern AP1 may include a channel region, a source region, and a drain region. For example, the first active pattern AP1 may include a first channel region CH1, a first source region SR1 contacting the first channel region CH1, and a first drain region DR1 contacting the first channel region CH1. The first source region SR1 and the first drain region DR1 may serve as a source electrode and a drain electrode, respectively.

A first gate insulation layer GI1 may cover the first active pattern AP1 and may be disposed on the substrate SUB. The first gate insulation layer GI1 may include an insulating material. Examples of the insulating material forming the first gate insulation layer GI1 may include silicon oxide, silicon nitride, silicon oxynitride, aluminum oxide, etc. These materials may be used alone or in mixture. The first gate insulation layer GI1 may have a single layer or multilayer structure.

Referring to FIGS. 2, 3, 4, 5, and 11, the first gate layer GT1 may be disposed on the first gate insulation layer GI1. The first gate layer GT1 may include a write gate line GT1*a*, a gate electrode GT1*b*, and a light emission control line GT1*c*.

The write gate line GT1*a* may extend in the third direction DR3. The write gate line GT1*a* may form the second transistor T2 together with the first active pattern AP1. For example, a first gate signal GW may be provided to the write gate line GT1*a*. Also, the write gate line GT1*a* may form a seventh transistor T7 together with the first active pattern AP1. For example, the fourth gate signal GB may be provided to the write gate line GT1*a*. The first gate signal GW and the fourth gate signal GB may have substantially the same waveform with a time difference.

The gate electrode GT1*b* may be disposed in an island shape. The gate electrode GT1*b* may form the first transistor T1 together with the first active pattern AP1.

The light emission control line GT1*c* may extend in the third direction DR3. The light emission control line GT1*c* may form the fifth and sixth transistors T5 and T6 together with the first active pattern AP1. For example, the light emission driving signal EM may be provided to the light emission control line GT1*c*.

A material forming the first gate layer GT1 may be a metal, an alloy, a conductive metal oxide, a transparent conductive material, etc. For example, examples of the metal forming the first gate layer GT1 may include molybdenum (Mo), aluminum (Al), copper (Cu), titanium (Ti), etc. These materials may be used alone or in mixture.

The second gate insulation layer GI2 may cover the first gate layer GT1 and may be disposed on the first gate insulation layer GI1. The second gate insulation layer GI2 may include an insulating material. Examples of the insulating material forming the second gate insulation layer GI2 may include silicon oxide, silicon nitride, silicon oxynitride, etc. These materials may be used alone or in mixture. The second gate insulation layer GI2 may have a single layer or multilayer structure.

Referring to FIGS. 2, 3, 4, 5, 6, and 11, the second gate layer GT2 may be disposed on the second gate insulation layer GI2. The second gate layer GT2 may include a voltage line GT2*a*, a lower initialization gate line GT2*b*, a lower compensation gate line GT2*c*, and a first storage capacitor electrode GT2*d*.

The lower initialization gate line GT2*b* may extend in the third direction DR3. For example, the lower initialization gate line GT2*b* may be spaced apart from the write gate line GT1*a* in a plan view. The third gate signal GI may be provided to the lower initialization gate line GT2*b*.

The lower compensation gate line GT2*c* may extend in the third direction DR3. The second gate signal GC may be provided to the lower compensation gate line GT2*c*.

The first storage capacitor electrode GT2*d* may overlap the gate electrode GT1*b* in a plan view. For example, the first storage capacitor electrode GT2*d* may form a storage capacitor CST together with the gate electrode GT1*b*. A hole passing through the first storage capacitor electrode GT2*d* may be defined in the first storage capacitor electrode GT2*d*, and the gate electrode GT1*b* may be exposed through the hole.

The voltage line GT2*a* may extend in the third direction DR3. In an embodiment, the initialization voltage VINT may be provided to the voltage line GT2*a*.

The second gate layer GT2 may include a metal, an alloy, a conductive metal oxide, a transparent conductive material, etc. Specifically, the second gate layer GT2 may include the metal such as molybdenum (Mo), aluminum (Al), copper (Cu), or titanium (Ti).

A first interlayer-insulation layer ILD1 may cover the second gate layer GT2 and may be disposed on the second gate insulation layer GI2. The first interlayer-insulation layer ILD1 may include an insulating material. Examples of the insulating material forming the first interlayer-insulation layer ILD1 may include silicon oxide, silicon nitride, silicon oxynitride, aluminum oxide, etc. These materials may be used alone or in mixture.

Referring to FIGS. 2, 3, 4, 5, 6, 7, and 11, a second active pattern AP2 may be disposed on the first interlayer-insulation layer ILD1. The second active pattern AP2 may include an oxide semiconductor. The first active pattern AP1 and the second active pattern AP2 may include different materials from each other.

For example, examples of the material forming the second active pattern AP2 may include binary compound (ABx), ternary compound (ABxCy), quaternary compound (ABxCyDz), and the like including indium (In), zinc (Zn), gallium (Ga), tin (Sn), titanium (Ti), aluminum (Al), hafnium (Hf), zirconium (Zr), magnesium (Mg), etc. These materials may be used alone or in mixture. For example, the second active pattern AP2 may include indium-gallium-zinc oxide.

The second active pattern AP2 may be disposed on a different layer from the first active pattern AP1 and may not overlap the first active pattern AP1 in a plan view. That is, the second active pattern AP2 may be spaced apart from the first active pattern AP1 in a plan view. The second active pattern AP2 may be formed separately from the first active pattern AP1.

The second active pattern AP2 may have a symmetrical shape based on an imaginary line extending in the fourth direction DR4. The second active pattern AP2 may include a portion disposed on the first pixel circuit PXC1 and a portion disposed on the second pixel circuit PXC2.

The second active pattern AP2 may overlap the write gate line GT1*a*, the lower initialization gate line GT2*b*, the lower compensation gate line GT2*c*, and the voltage line GT2*a* in a plan view.

The second active pattern AP2 may include a channel region, a source region, and a drain region. For example, the second active pattern AP2 may include a second channel region CH2, a second source region SR2 contacting the second channel region CH2, and a second drain region DR2 contacting the second channel region CH2. The second source region SR2 and the second drain region DR2 may serve as a source electrode and a drain electrode, respectively.

The third gate insulation layer GI3 may cover the second active pattern AP2 and may be disposed on the first interlayer-insulation layer ILD1. The third gate insulation layer GI3 may include an insulating material. Examples of the insulating material forming the third gate insulation layer GI3 may include silicon oxide, silicon nitride, silicon oxynitride, etc. These materials may be used alone or in mixture. The third gate insulation layer GI3 may have a single layer or multilayer structure.

Referring to FIGS. 2, 3, 4, 5, 6, 7, 8, and 11, a third gate layer GT3 may be disposed on the third gate insulation layer GI3. The third gate layer GT3 may include an upper initialization gate line GT3*a* and an upper compensation gate line GT3*b*. The upper initialization gate line GT3*a* may extend in the third direction DR3. The upper initialization gate line GT3*a* may overlap the lower initialization gate line GT2*b* and the second active pattern AP2 in a plan view. The upper initialization gate line GT3*a* may be electrically connected to the lower initialization gate line GT2*b*. For example, the upper initialization gate line GT3*a* may contact the lower initialization gate line GT2*b* through a contact. The upper initialization gate line GT3*a*, the second active pattern AP2, and the lower initialization gate line GT2*b* may form the fourth transistor T4. For example, the lower initialization gate line GT2*b* may correspond to the back-gate terminal of the fourth transistor T4 described with reference to FIG. 2, and the upper initialization gate line GT3*a* may correspond to the gate terminal of the fourth transistor T4 described with reference to FIG. 2. The upper compensation gate line GT3*b* may extend in the third direction DR3.

The upper compensation gate line GT3*b* may overlap the lower compensation gate line GT2*c* and the second active pattern AP2 in a plan view. The upper compensation gate line GT3*b* may be electrically connected to the lower compensation gate line GT2*c*. For example, the upper compensation gate line GT3*b* may contact the lower compensation gate line GT2*c* through a contact. The second gate signal GC may be provided to the upper compensation gate line GT3*b*. The lower compensation gate line GT2*c*, the second active pattern AP2, and the upper compensation gate line GT3*b* may form the third transistor T3. For example, the lower compensation gate line GT2*c* may correspond to the back-gate terminal of the third transistor T3 described with reference to FIG. 2, and the upper compensation gate line GT3*b* may correspond to the gate terminal of the third transistor T3 described with reference to FIG. 2.

For example, the third gate layer GT3 may include a metal, a metal alloy, a metal nitride, a conductive metal oxide, etc. For example, the third gate layer GT3 may include the same material as the first gate layer GT1 or the second gate layer GT2.

The second interlayer-insulation layer ILD2 may cover the third gate layer GT3 and may be disposed on the third gate insulation layer GI3. The second interlayer-insulation layer ILD2 may include an insulating material. For example, examples of the insulating material forming the second interlayer-insulation layer ILD2 may include silicon oxide, silicon nitride, silicon oxynitride, aluminum oxide, etc.

Referring to FIGS. 2, 3, 4, 5, 6, 7, 8, 9 and 11, a first conductive layer SD1 may be disposed on the second interlayer-insulation layer ILD2. The first conductive layer SD1 may include an initialization voltage connection electrode SD1*a*, a first transmission pattern SD1*b*, an anode initialization voltage line SD1*c*, a second transmission pattern SD1*d*, a third transmission pattern SD1*e*, a fourth transmission pattern SDlf and a fifth transmission pattern SD1*g*.

The first transmission pattern SD1*b* may contact the first active pattern AP1. The data voltage DATA may be transmitted to the first active pattern AP1 through the first transmission pattern SD1*b*.

The anode initialization voltage line SD1*c* may extend in the third direction DR3. The anode initialization voltage AINT may be provided to the anode initialization voltage line SD1*c*. The anode initialization voltage line SD1*c* may contact the first active pattern AP1, and may transmit the anode initialization voltage AINT to the first active pattern AP1.

The second transmission pattern SDld may contact the second active pattern AP2 and the gate electrode GT1*b*. Specifically, the second transmission pattern SDld may connect the gate electrode GT1*b* of the first transistor T1 and the source electrode of the third transistor T3 (e.g., the third source terminal of FIG. 2), and a source electrode (e.g., the fourth source terminal of FIG. 2) of the fourth transistor T4.

The third transmission pattern SD1*e* may contact the second active pattern AP2 and the first active pattern AP1. The third transmission pattern SD1*e* may electrically connect the second active pattern AP2 and the first active pattern AP1.

The fourth transmission pattern SD1*f* may extend in the third direction DR3. The high power voltage ELVDD may be provided to the fourth transmission pattern SD1*f*. The fourth transmission pattern SD1*f* may contact the first active pattern AP1 and transmit the high power voltage ELVDD to the first active pattern AP1.

The fifth transmission pattern SD1*g* may contact the first active pattern AP1. The fifth transmission pattern SD1*g* may transmit the driving current or the anode initialization voltage AINT from the first active pattern AP1 to the light emitting diode LD.

The initialization voltage connection electrode SD1*a* may be connected to the voltage line GT2*a* and the second active pattern AP2 through contacts, respectively. Specifically, the initialization voltage connection electrode SD1*a* may be connected to a drain electrode (e.g., the fourth drain terminal of FIG. 2) of the fourth transistor T4.

A first via insulation layer may cover the first conductive layer SD1 and may be disposed on the second interlayer-insulation layer ILD2. The first via insulation layer may include an organic insulating material. For example, examples of the organic insulating material forming the first via insulation layer may include a photoresist, a polyacrylic resin, a polyimide resin, an acrylic resin, etc.

Referring to FIGS. 2, 3, 4, 5, 6, 7, 8, 9, 10 and 11, the second conductive layer SD2 may be disposed on the first via insulation layer. The second conductive layer SD2 may include a data line SD2*a*, a high power voltage line SD2*b*, and a sixth transmission pattern SD2*c*. The data line SD2*a* may correspond to the data line DL of FIG. 1.

The data line SD2*a* may extend in the fourth direction DR4. The data voltage DATA may be transmitted to the first active pattern AP1 through the data line SD2*a* and the first transmission pattern SD1b.

The high power voltage line SD2*b* may be spaced apart from the data line SD2*a* and extend in the fourth direction DR4. The high power voltage line SD2*b* may be connected to the fourth transmission pattern SDlf through a contact. Accordingly, the high power voltage line SD2*b* may be connected to the drain electrode (e.g., the fifth drain terminal described with reference to FIG. 2) of the fifth transistor T5 and the drain electrode of the storage capacitor CST by the fourth transmission pattern SDlf.

The sixth transmission pattern SD2*c* may contact the fifth transmission pattern SD1*g*. The sixth transmission pattern SD2*d* may transmit the driving current or the anode initialization voltage AINT from the fifth transmission pattern SD1*g* to the light emitting diode LD.

A second via insulation layer may cover the second conductive layer SD2 and may be disposed on the first via insulation layer. The second via insulation layer may include an organic insulating material.

Meanwhile, the layout structure illustrated in FIGS. 3 to 10 is exemplary and may be variously changed.

Figure 12:
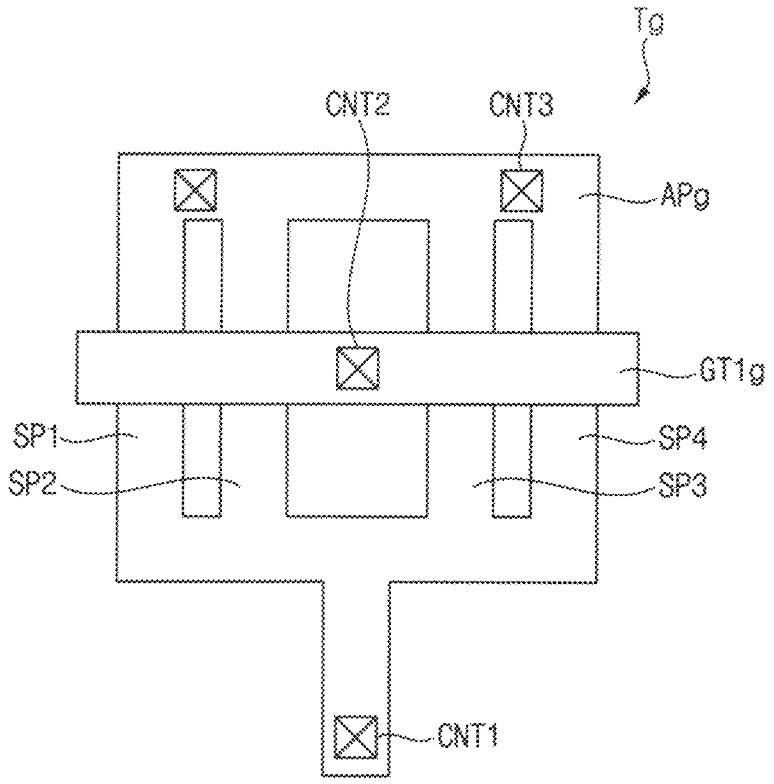
FIG. 12 is a plan view for explaining the global transistor of FIG. 11.

FIG. 12 is a plan view for explaining the global transistor of FIG. 11.

Referring to FIGS. 11 and 12, the global transistor Tg may include a global active pattern APg and a global gate electrode GT1*g*.

Figure 4:
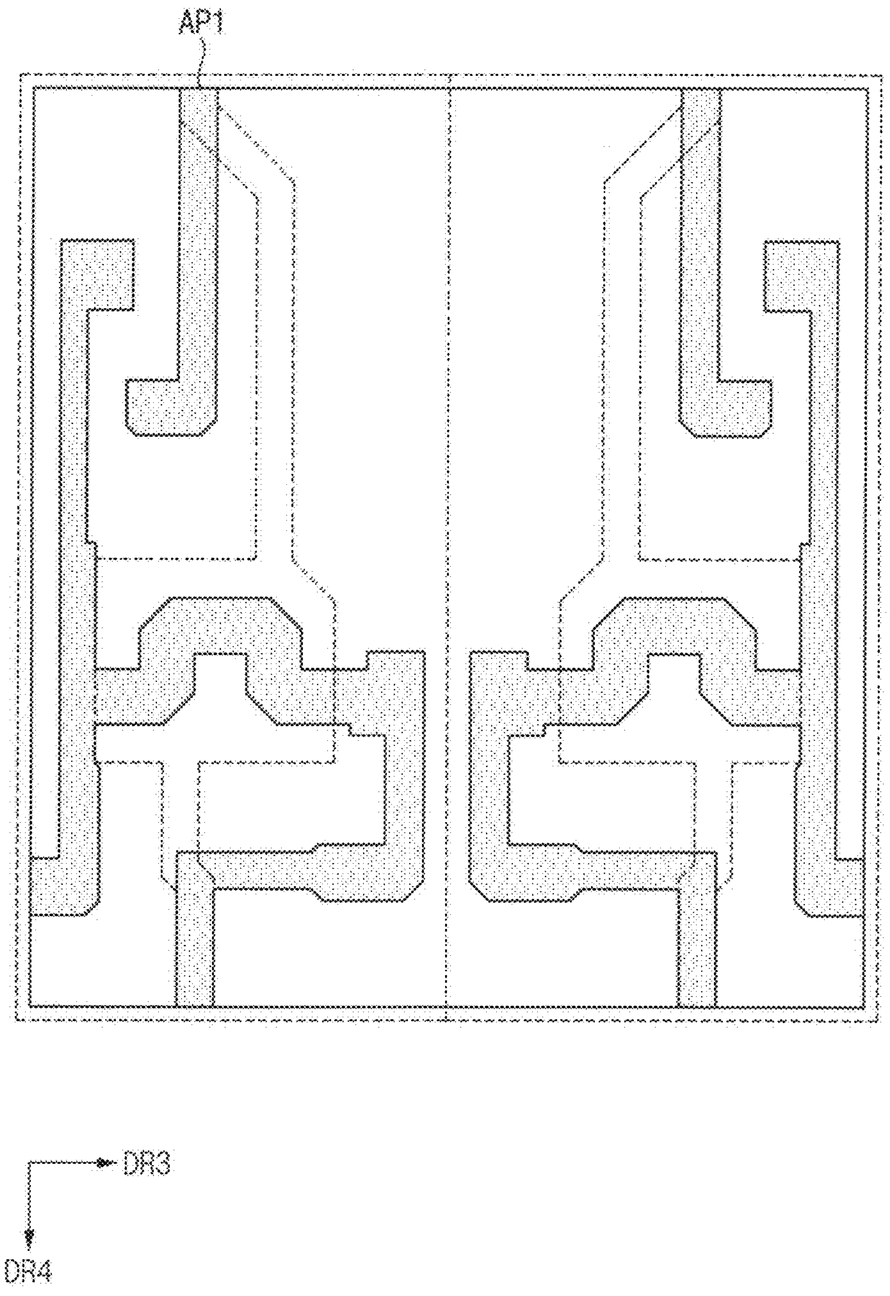

The global active pattern APg may be disposed in the same layer as the first active pattern (e.g., the first active pattern AP1 of FIG. 4). The global active pattern APg may include a channel region, a source region, and a drain region. For example, the global transistor Tg may include a global channel region CHg, a global source region SRg contacting with the global channel region CHg, and a global drain region DRg contacting with the global channel region CHg. The global source region SRg and the global drain region DRg may serve as a source electrode and a drain electrode, respectively.

In an embodiment, the global drain region DRg may be connected to the connection pattern GT3*g* through a first contact hole CNT1. The connection pattern GT3*g* may be disposed in the same layer as the third gate layer GT3. The connection pattern GT3*g* may be disposed to be spaced apart from the upper compensation gate line GT3*b*.

The connection pattern GT3*g* may be connected to the back-gate pattern BP through the fourth contact hole CNT4. Accordingly, the global drain region DRg may provide the first voltage (e.g., the first voltage V1 of FIG. 2) that decreases over time to the back-gate pattern BP.

In an embodiment, the global source region SRg may be electrically connected to a voltage supply line VL for providing a third voltage (e.g., the third voltage V3 of FIG. 2) having a positive polarity through a third contact hole CNT3. For example, in an embodiment, the third voltage having the positive polarity may be a high power voltage (e.g., the high power voltage ELVDD of FIG. 2). Also, the voltage supply line VL may be the high power voltage line (e.g., the high power voltage line SD2*b* of FIG. 10) for providing the high power voltage. The high power voltage line may provide the high power voltage to the global source region SRg. However, embodiments according to the present invention may not be limited thereto.

In an embodiment, the global channel region CHg may be disposed between the global source region SRg and the global drain region DRg.

The global active pattern APg may include first to fourth sub-patterns SP1, SP2, SP3, and SP4. The first to fourth sub-patterns SP1, SP2, SP3, and SP4 may be connected in parallel to each other. However, embodiments according to the present invention are not limited thereto, and in other embodiments, the global active pattern APg may include three or less sub-patterns, or five or more sub-patterns.

Figure 5:
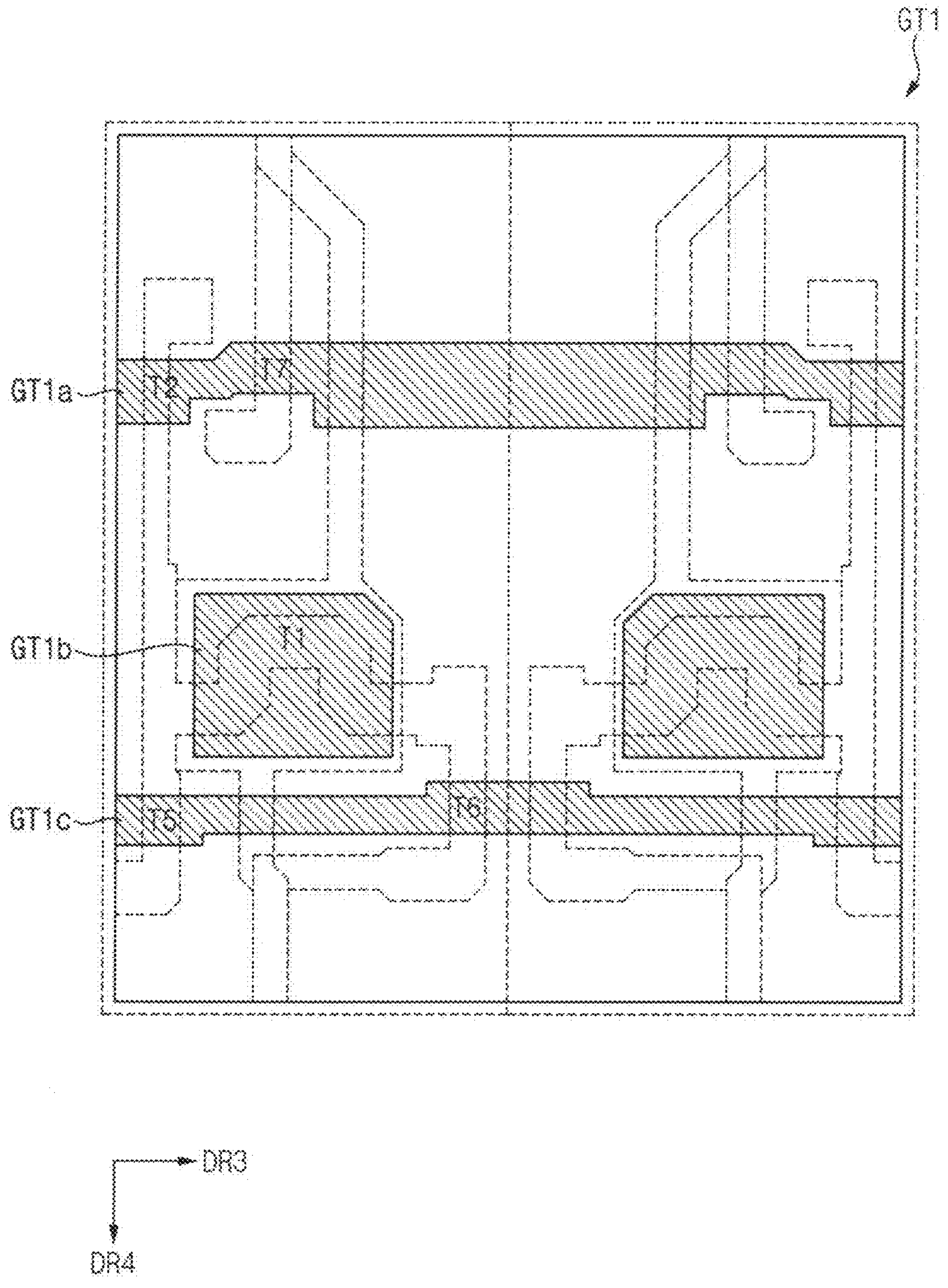
Figure 6:
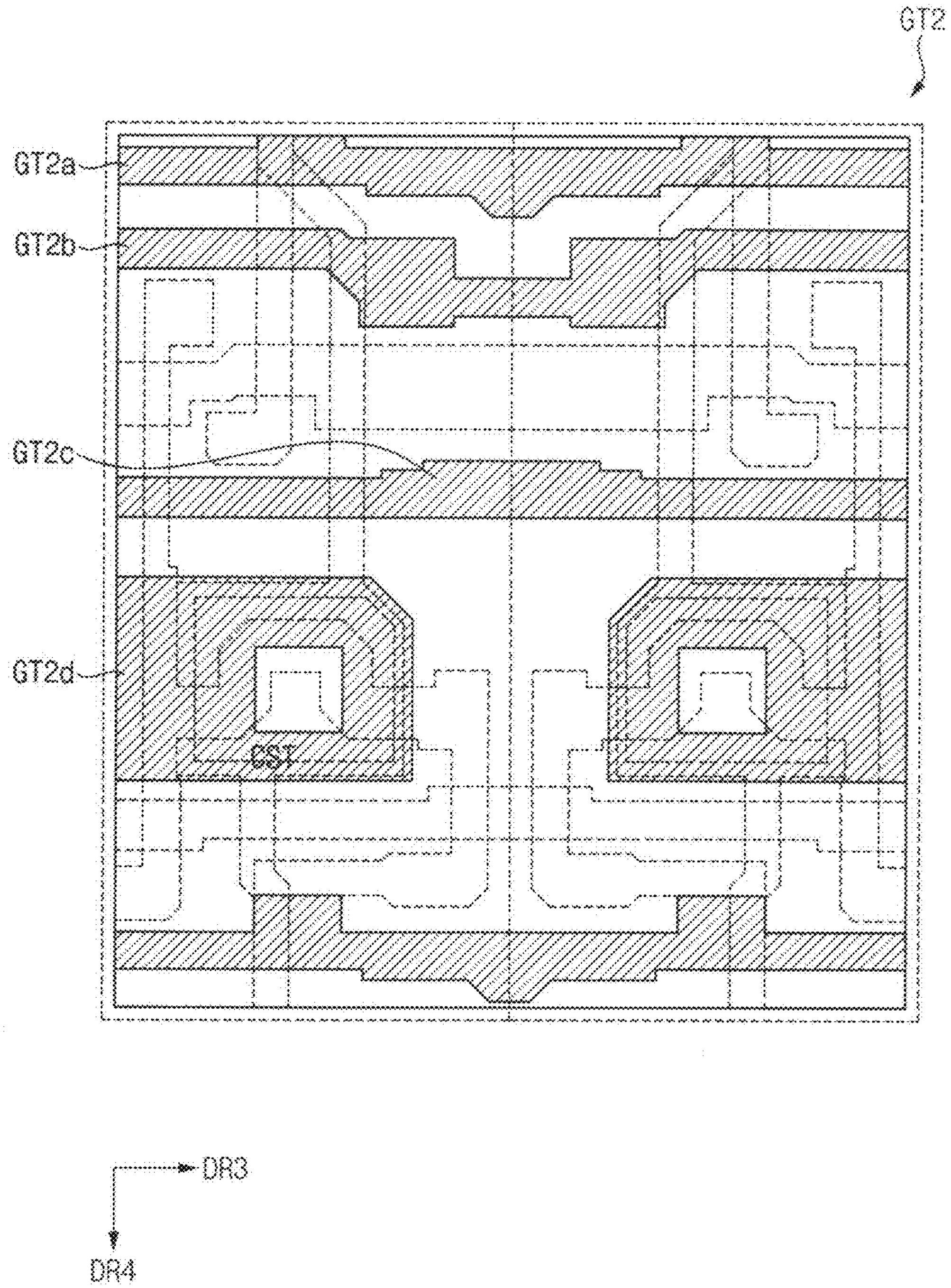
Figure 7:
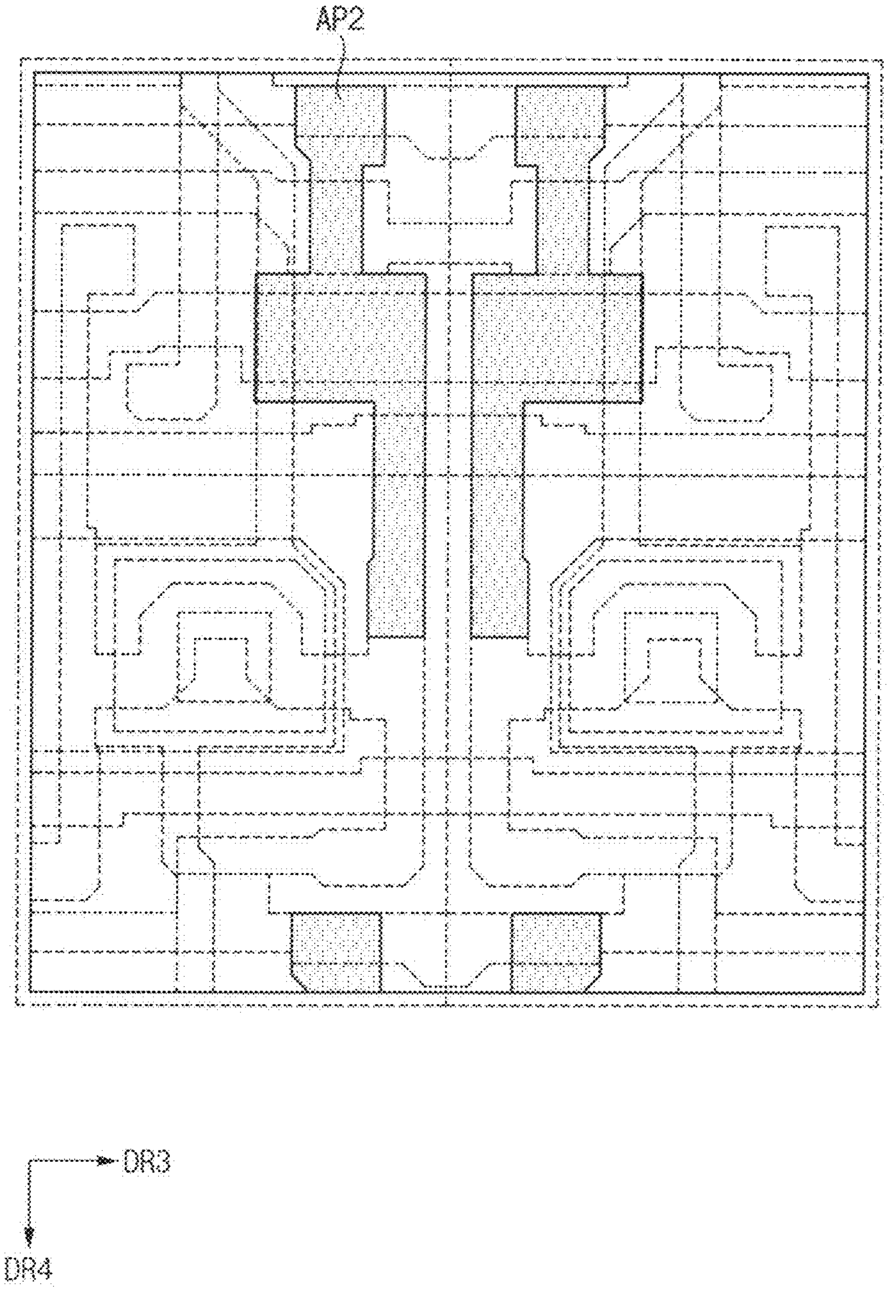
Figure 8:
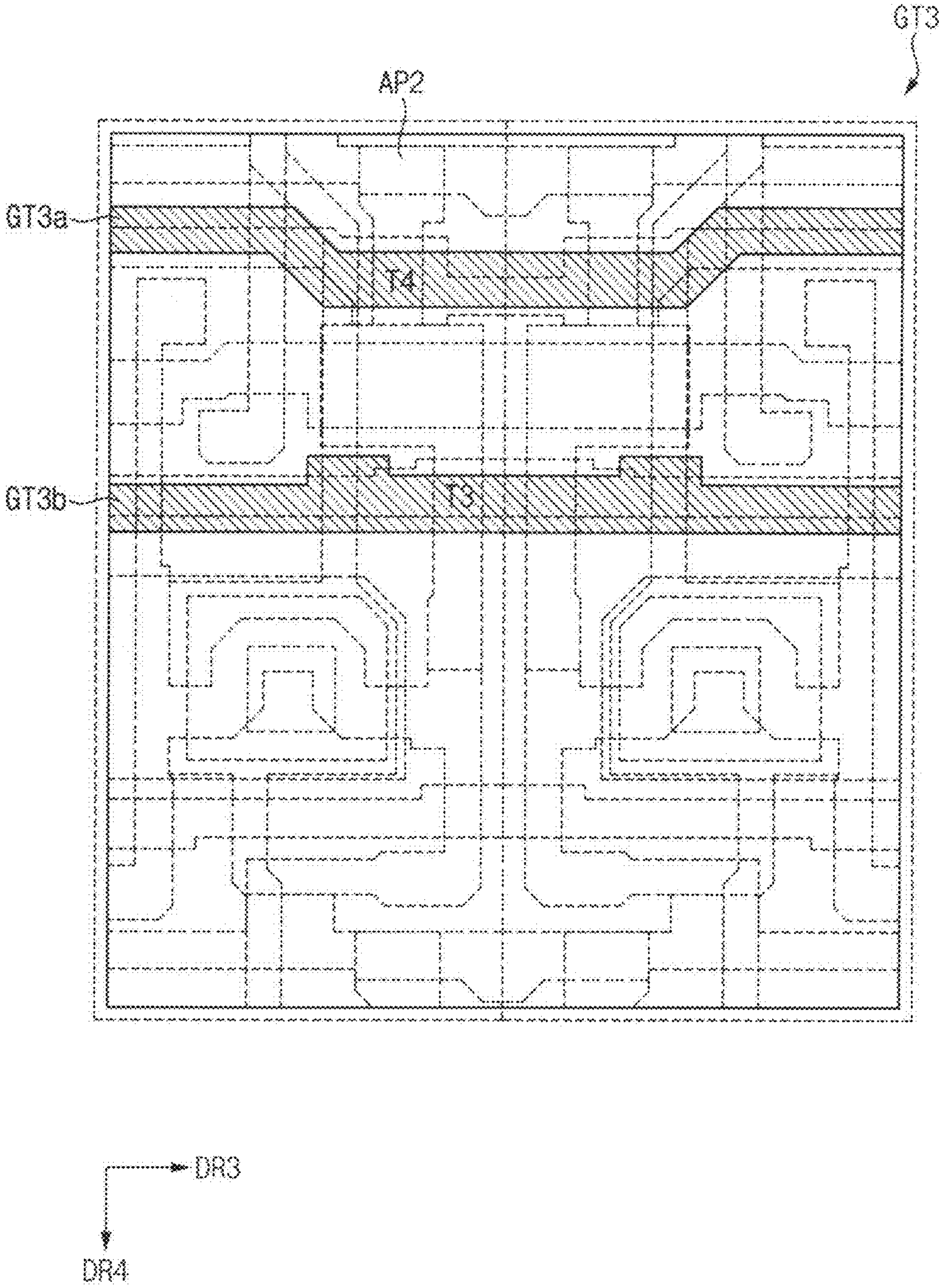
Figure 9:
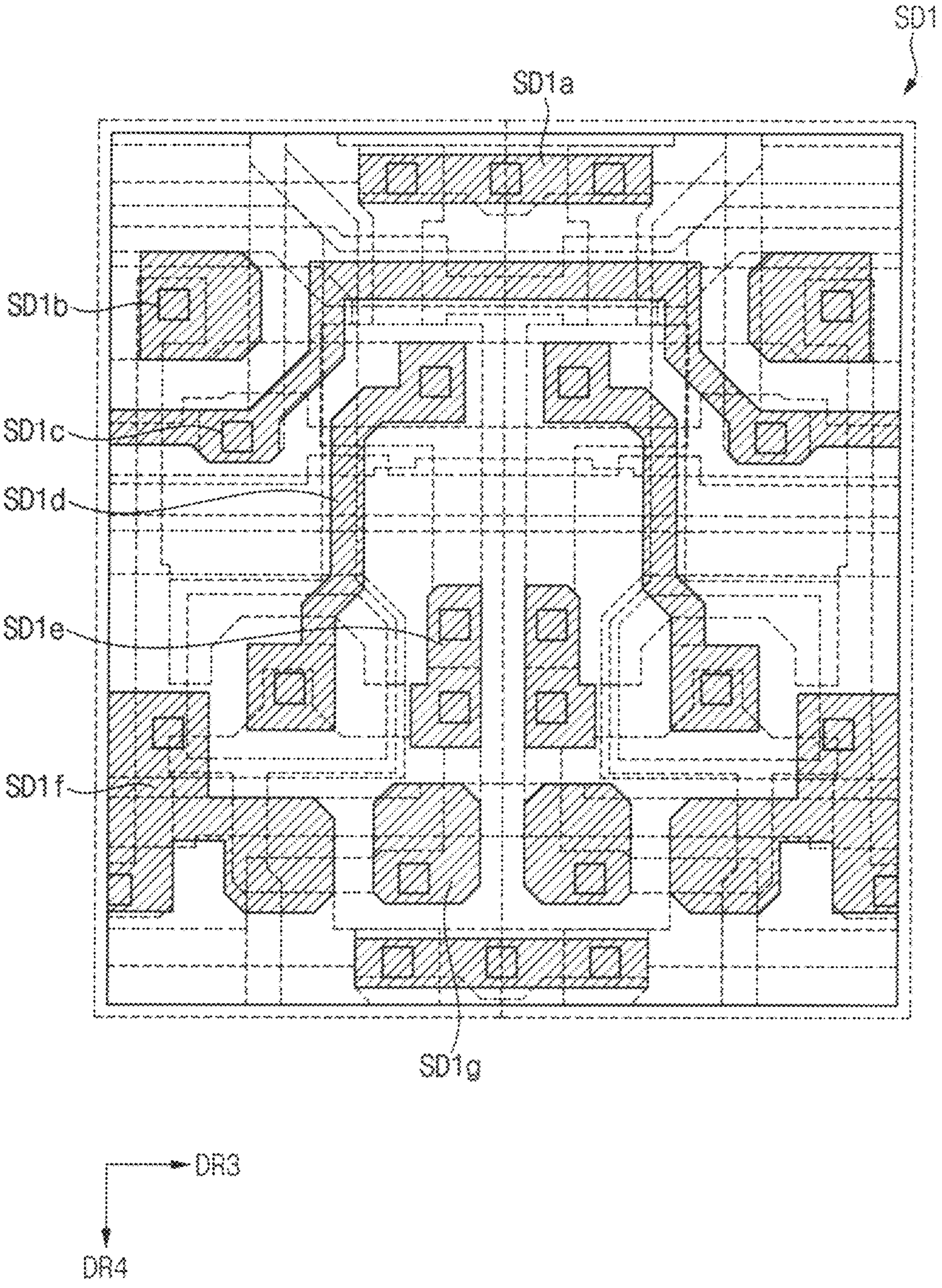
Figure 10:
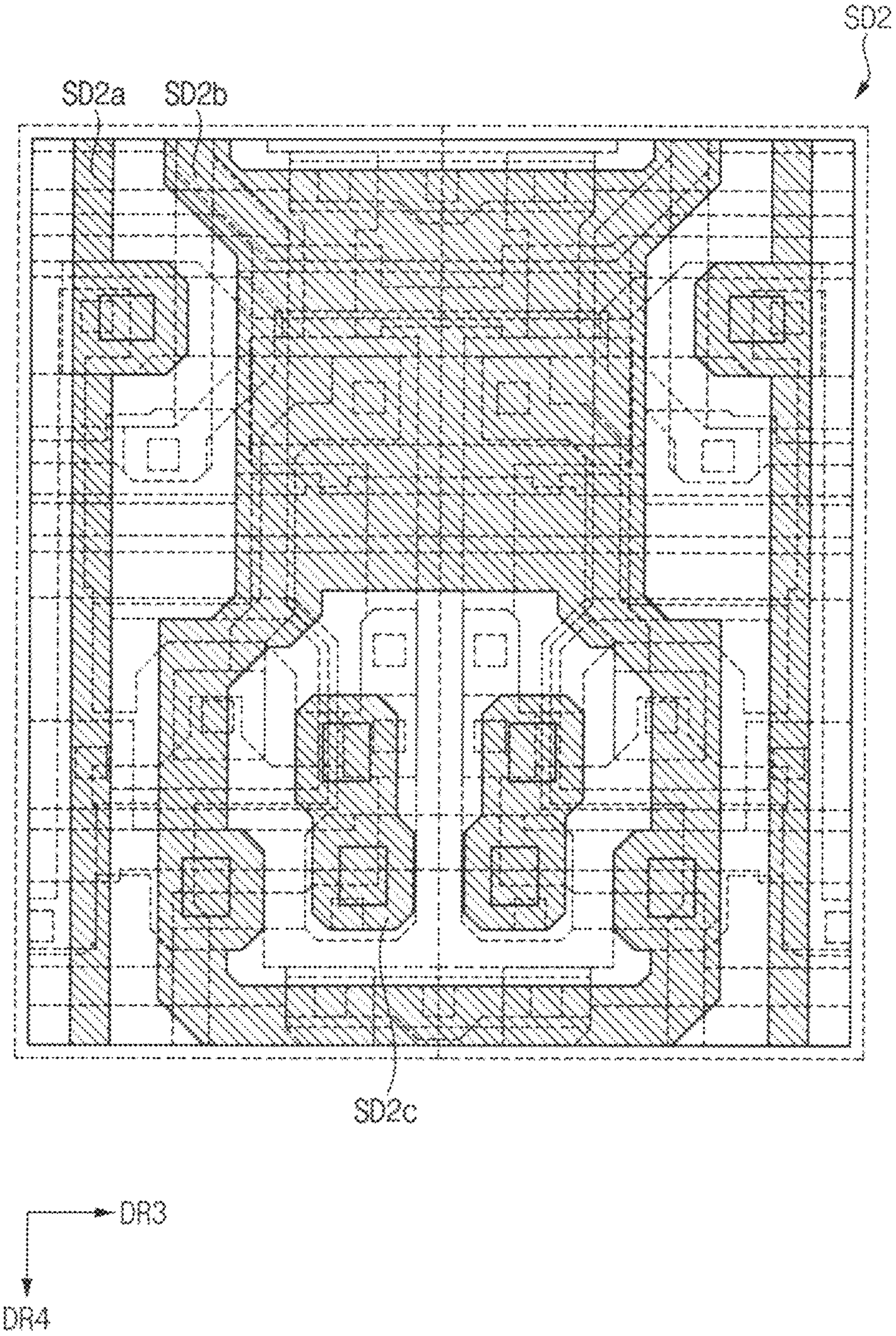

In an embodiment, the global gate electrode GT1*g* may be disposed in the same layer as the first gate layer (e.g., the first gate layer GT1 of FIG. 5). The global gate electrode GT1*g* may overlap the global channel region CHg in a plan view. The global gate electrode GT1*g* may be electrically connected to an electrode VP for providing a second voltage (e.g., the second voltage V2 in FIG. 2) having a negative polarity through a second contact hole CNT2. That is, the global gate electrode GT1*g* may receive the second voltage.

In an embodiment, the second voltage having the negative polarity may be a low power voltage. Also, the electrode VP may be a common electrode disposed on the display device 10. However, embodiments according to the present invention may not be limited thereto. For example, in other embodiment, the second voltage may be a transistor initialization voltage (e.g., the transistor initialization voltage VINT of FIG. 2), and the electrode VP may be a transistor initialization voltage line (e.g., the voltage line GT2*a* of FIG. 6). Alternatively, the second voltage may be an anode initialization voltage (e.g., the anode initialization voltage AINT of FIG. 2) and the electrode VP may be an anode initialization voltage line (e.g., the anode initialization voltage line SD1*c* of FIG. 9).

As the global source region SRg of the global transistor Tg receives the third voltage from the voltage supply line VL, and the global gate electrode GT1*g* receives the second voltage from the electrode VP, a threshold voltage of the global transistor Tg may decrease over time. As a result, the threshold voltage of the global transistor Tg may have a negative polarity.

Figure 13:
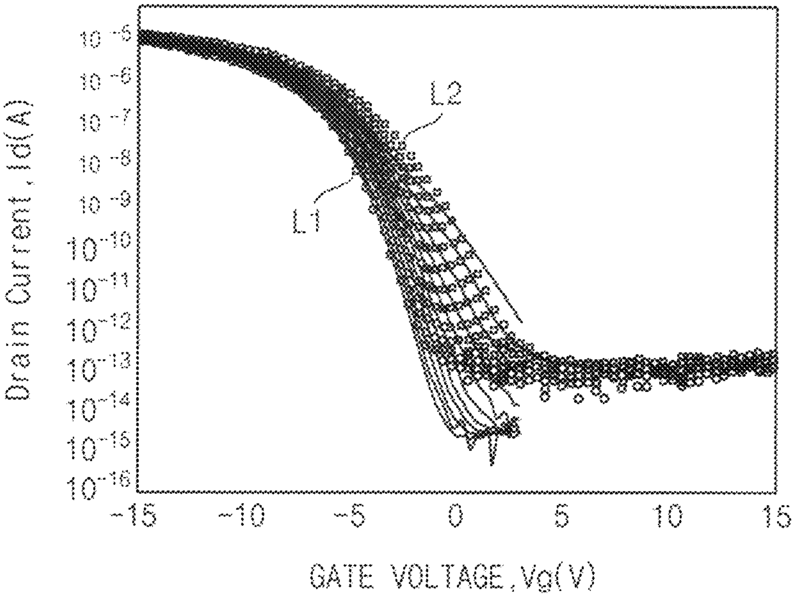
FIG. 13 is a graph for explaining a change of a driving range of a first transistor according to a first voltage applied to a back-gate terminal of the first transistor.

FIG. 13 is a graph for explaining a change of a driving range regarding a driving current of a first transistor according to a first voltage applied to a back-gate terminal of the first transistor.

Referring to FIGS. 2 and 13, the driving range regarding the driving current of the first transistor T1 may change with time. Specifically, the driving range DR-range of the first transistor T1 may be changed according to a change of the first voltage V1 applied to the back-gate terminal BML. In FIG. 13, a first curve L1 is a case in which the first voltage V1 having a positive polarity is applied to the back-gate terminal BML, and a second curve L2 is a case in which the first voltage V1 having a negative polarity is applied to the back-gate terminal BML. The driving range may be inversely proportional to an absolute value of a slope of a curve (hereinafter, an I-V curve) representing a relationship between a drain current Id and a gate voltage Vg of the first transistor T1.

Referring to FIGS. 2 and 13, the driving range of the first transistor T1 may change with time. Specifically, the driving range DR-range of the first transistor T1 may be changed according to a change of the first voltage V1 applied to the back-gate terminal BML. In FIG. 13, a first curve L1 is a case in which the first voltage V1 having a positive polarity is applied to the back-gate terminal BML, and a second curve L2 is a case in which the first voltage V1 having a negative polarity is applied to the back-gate terminal BML. The driving range may be inversely proportional to an absolute value of a slope of a curve (hereinafter, an I-V curve) representing a relationship between a drain current Id and a gate voltage Vg of the first transistor T1.

Figure 14:
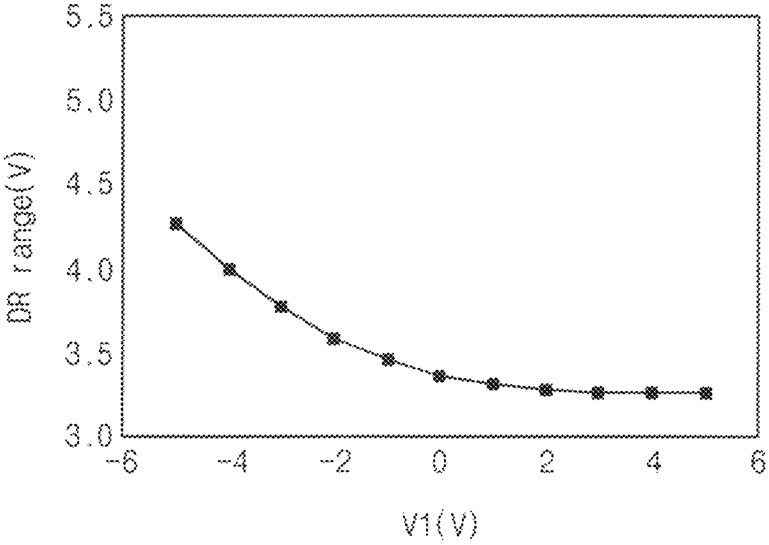
FIG. 14 is a graph for explaining a change in a driving range regarding a driving voltage of the first transistor according to a first voltage applied to a back-gate terminal of the first transistor.

FIG. 14 is a graph for explaining a change in a driving range regarding a driving voltage of the first transistor according to a first voltage applied to a back-gate terminal of the first transistor.

FIG. 14 is a graph for explaining a change in a driving range of the first transistor according to a first voltage applied to a back-gate terminal of the first transistor.

Referring to FIGS. 2 and 14, as a level of the first voltage V1 applied to the back-gate terminal BML decreases, the driving range DR-range of the first transistor T1 may be increased. The driving range DR-range of the first transistor T1 may mean a difference between a maximum data voltage corresponding to a maximum gray scale and a minimum data voltage corresponding to a minimum gray scale.

When the driving range DR-range is large, the gray scale of light emitted from the light emitting diode LD may be more precisely controlled. Accordingly, a life span of the light emitting diode LD may be improved. Also, a resolution of the display device 10 may be increased accordingly. Therefore, a display quality of the display device 10 may be improved.

In addition, the light emitting diode LD of the display device 10 may deteriorate over time, and an afterimage may be generated in the display device 10 due to the deterioration. When the driving range of the first transistor T1 is large, the afterimage of the display device 10 due to the deterioration may be effectively improved.

Figure 15:
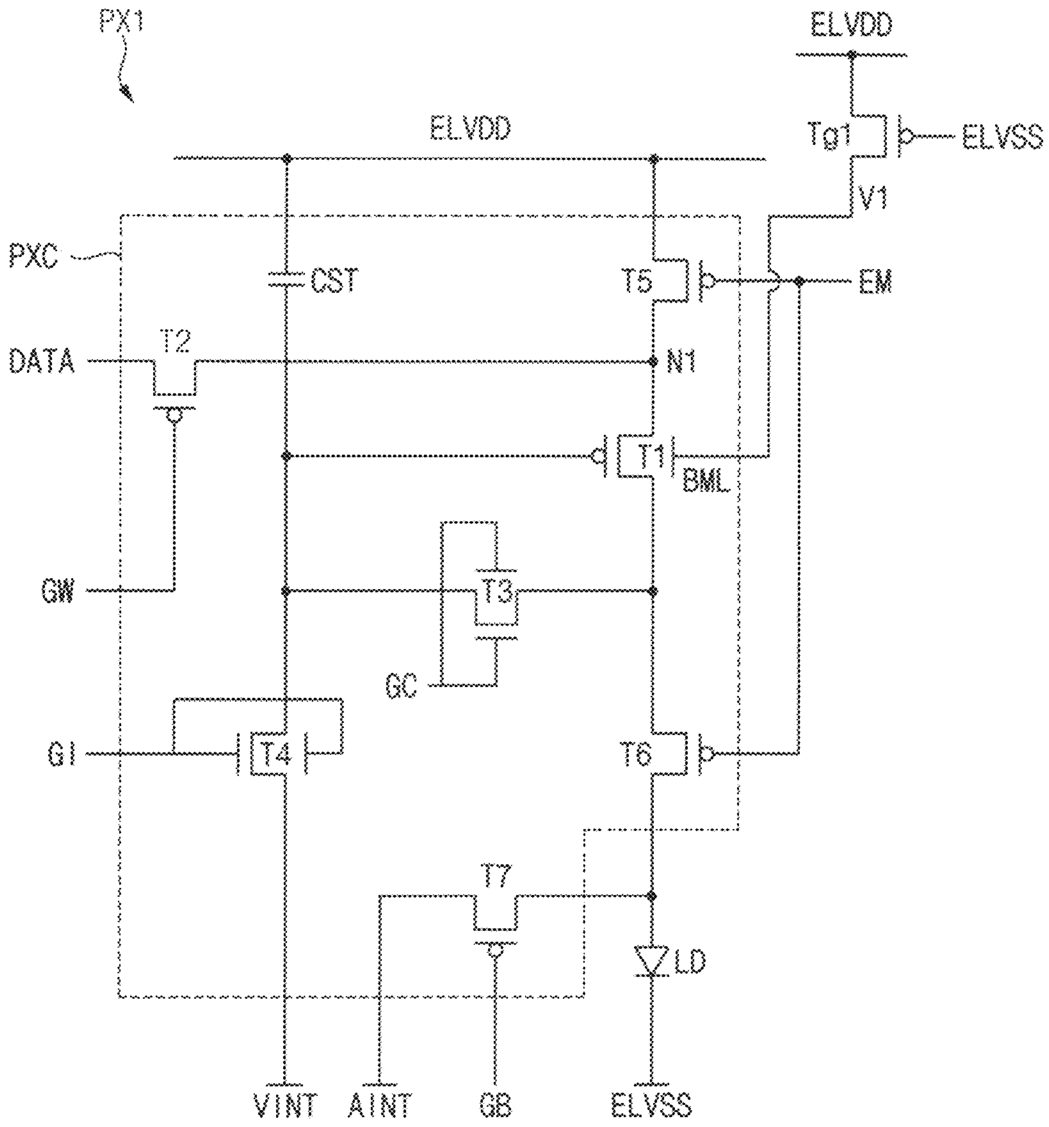

FIG. 15 is a circuit diagram illustrating another example of a pixel and a global transistor included in the display device of FIG. 1.

A first global transistor Tg1 of FIG. 15 may have a substantially same or similar configuration with the global transistor Tg of FIG. 2 except that a global source terminal of a first global transistor Tg1 included in the display device receive the high power voltage ELVDD, and a global gate terminal receive the low power voltage ELVSS. Therefore, in describing the first global transistor Tg1 of FIG. 15, a description of a configuration substantially the same as or similar to the global transistor Tg of FIG. 2 may be omitted.

Referring to FIGS. 1 and 15, a pixel PX1 may be driven through the pixel circuit PXC. The pixel PX1 may include the pixel circuit PXC and the light emitting diode LD, and may be connected to the first global transistor Tg1. The pixel circuit PXC may include the plurality of transistors and at least one capacitor.

In an embodiment, the pixel circuit PXC may include a first transistor T1, a second transistor T2, a third transistor T3, a fourth transistor T4, a fifth transistor T5, a sixth transistor T6, a seventh transistor T7, and a storage capacitor CST.

The first global transistor Tg1 may include a global gate terminal, a global source terminal, and a global drain terminal. The global gate terminal of the first global transistor Tg1 may receive the low power voltage ELVSS having the negative polarity. The global source terminal of the first global transistor Tg1 may receive the high power voltage ELVDD having the positive polarity. That is, the second voltage (e.g., the second voltage V2 of FIG. 2) may be the low power voltage ELVSS, and the third voltage (e.g., the third voltage V3 of FIG. 2) may be the high power voltage ELVDD. The global drain terminal of the first global transistor Tg1 may provide a first voltage (e.g., the first voltage V1 of FIG. 2) to the back-gate terminal BML.

As the high power voltage ELVDD having the positive polarity is provided to the global source terminal of the first global transistor Tg1 and the low power voltage ELVSS having the negative polarity is provided to the global gate terminal, the threshold voltage of the first global transistor Tg1 may change. Specifically, the threshold voltage of the first global transistor Tg1 may decrease over time.

Figure 16:
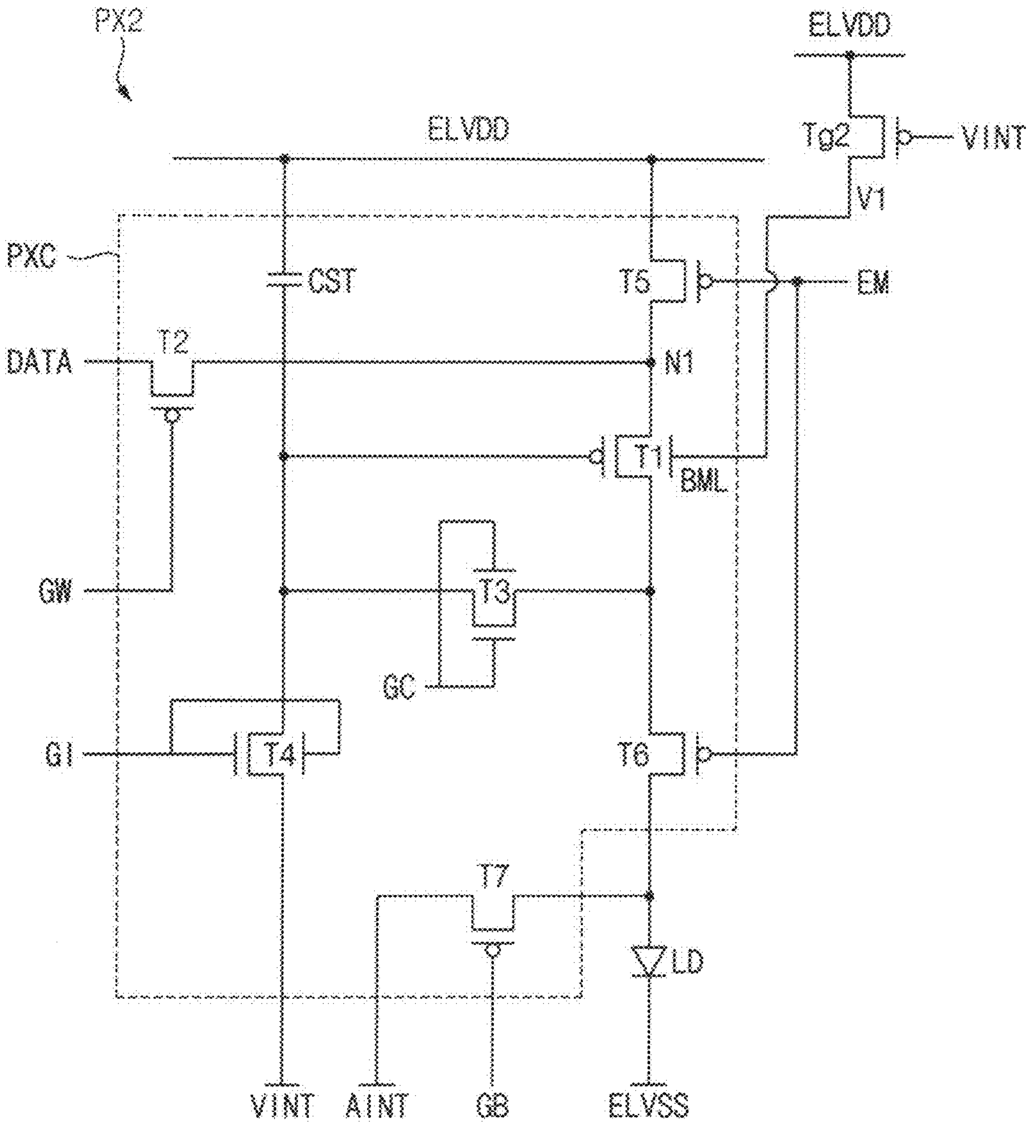
FIG. 16 is a circuit diagram illustrating still another example of a pixel and a global transistor included in the display device of FIG. 1.

FIG. 16 is a circuit diagram illustrating still another example of a pixel and a global transistor included in the display device of FIG. 1.

A second global transistor Tg2 of FIG. 16 may have a substantially same or similar configuration with the global transistor Tg of FIG. 2 except that a global source terminal of a second global transistor Tg2 included in the display device receive the high power voltage ELVDD, and a global gate terminal receive the transistor initialization voltage VINT. Therefore, in describing the second global transistor Tg2 of FIG. 16, a description of a configuration substantially the same as or similar to the global transistor Tg of FIG. 2 may be omitted.

Referring to FIGS. 1 and 16, a pixel PX2 may be driven through the pixel circuit PXC. The pixel PX2 may include the pixel circuit PXC and the light emitting diode LD, and may be connected to the second global transistor Tg2. The pixel circuit PXC may include the plurality of transistors and at least one capacitor.

The second global transistor Tg2 may include a global gate terminal, a global source terminal, and a global drain terminal. The global gate terminal of the second global transistor Tg2 may receive the transistor initialization voltage VINT having the negative polarity. The global source terminal of the second global transistor Tg2 may receive a high power voltage ELVDD having the positive polarity. That is, the second voltage (e.g., the second voltage V2 of FIG. 2) may be the transistor initialization voltage VINT, and the third voltage (e.g., the third voltage V3 of FIG. 2) may be the high power voltage ELVDD. The global drain terminal of the second global transistor Tg2 may provide the first voltage V1 to the back-gate terminal BML.

As the high power supply voltage ELVDD having the positive polarity is provided to the global source terminal of the second global transistor Tg2 and the transistor initialization voltage VINT having the negative polarity is provided to the global gate terminal, the threshold voltage of the second global transistor Tg2 may decrease over time.

Figure 17:
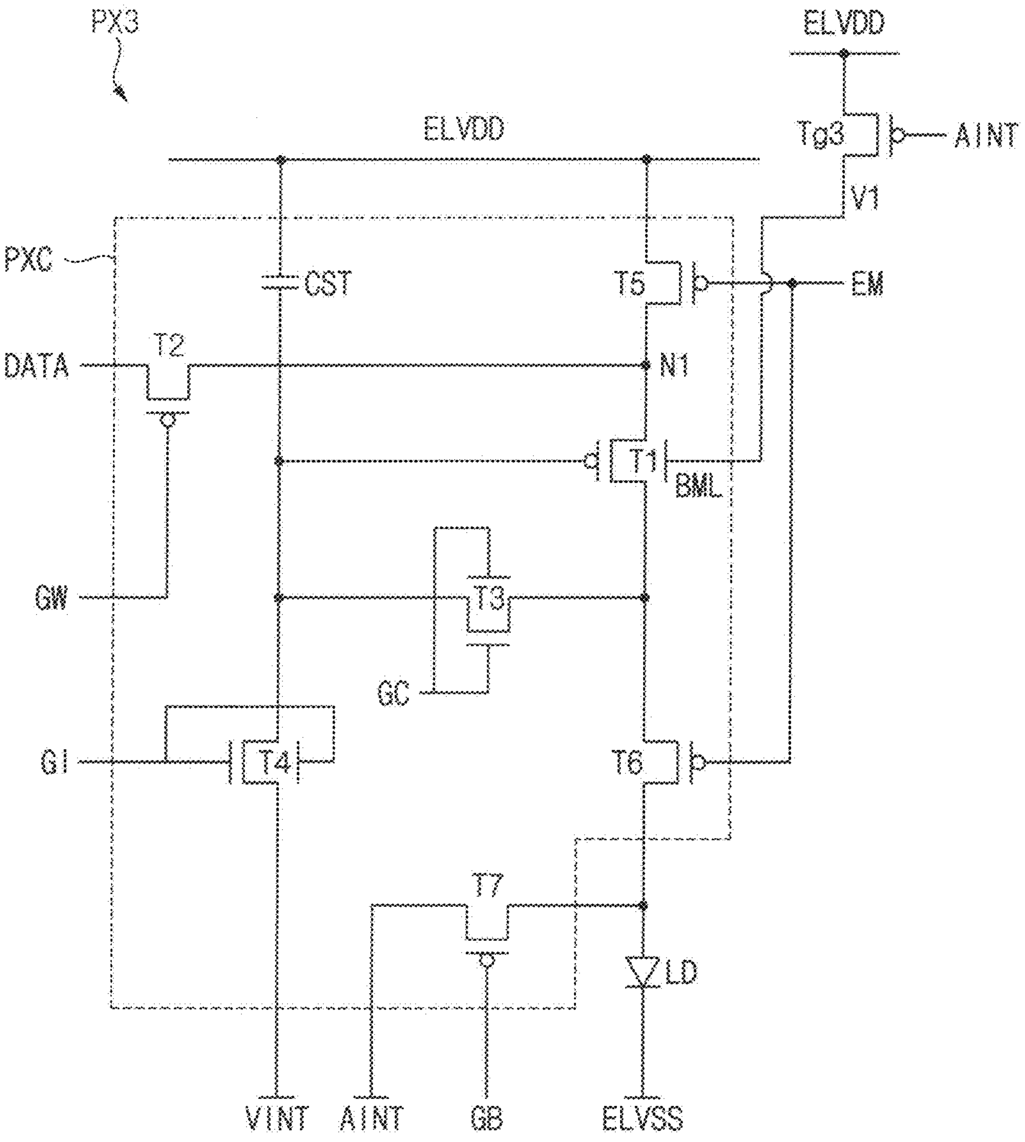
FIG. 17 is a circuit diagram illustrating yet another example of a pixel and a global transistor included in the display device of FIG. 1.

FIG. 17 is a circuit diagram illustrating yet another example of a pixel and a global transistor included in the display device of FIG. 1.

A third global transistor Tg3 of FIG. 17 may have a substantially same or similar configuration with the global transistor Tg of FIG. 2 except that a global source terminal of a third global transistor Tg3 included in the display device receive the high power voltage ELVDD, and a global gate terminal receive the anode initialization voltage ANT. Therefore, in describing the third global transistor Tg3 of FIG. 17, a description of a configuration substantially the same as or similar to the global transistor Tg of FIG. 2 may be omitted.

Referring to FIGS. 1 and 17, a pixel PX3 may be driven through a pixel circuit PXC. The pixel PX3 may include the pixel circuit PXC and the light emitting diode LD, and may be connected to the third global transistor Tg3. The pixel circuit PXC3 may include the plurality of transistors and at least one capacitor.

The third global transistor Tg3 may include a global gate terminal, a global source terminal, and a global drain terminal. The global gate terminal of the third global transistor Tg3 may receive an anode initialization voltage AINT having the negative polarity. The global source terminal of the third global transistor Tg3 may receive the high power voltage ELVDD having the positive polarity. That is, the second voltage (e.g., the second voltage V2 of FIG. 2) may be the anode initialization voltage AINT, and the third voltage (e.g., the third voltage V3 of FIG. 2) may be the high power voltage ELVDD. The global drain terminal of the third global transistor Tg3 may provide the first voltage V1 to the back-gate terminal BML.

As the high power voltage ELVDD having the positive polarity is provided to the global source terminal of the third global transistor Tg3 and the anode initialization voltage AINT having the negative polarity is provided to the global gate terminal, the threshold voltage of the third global transistor Tg3 may decrease over time.

When the voltage having the negative polarity is applied to the back-gate terminal BML, the absolute value of the slope of the I-V curve of the first transistor T1 may decrease, and the driving range of the first transistor T1 may be increased. When the driving range is large, the lifespan of the light emitting diode LD may be improved. Also, an afterimage of the display device due to deterioration may be effectively improved.

Figure 18:
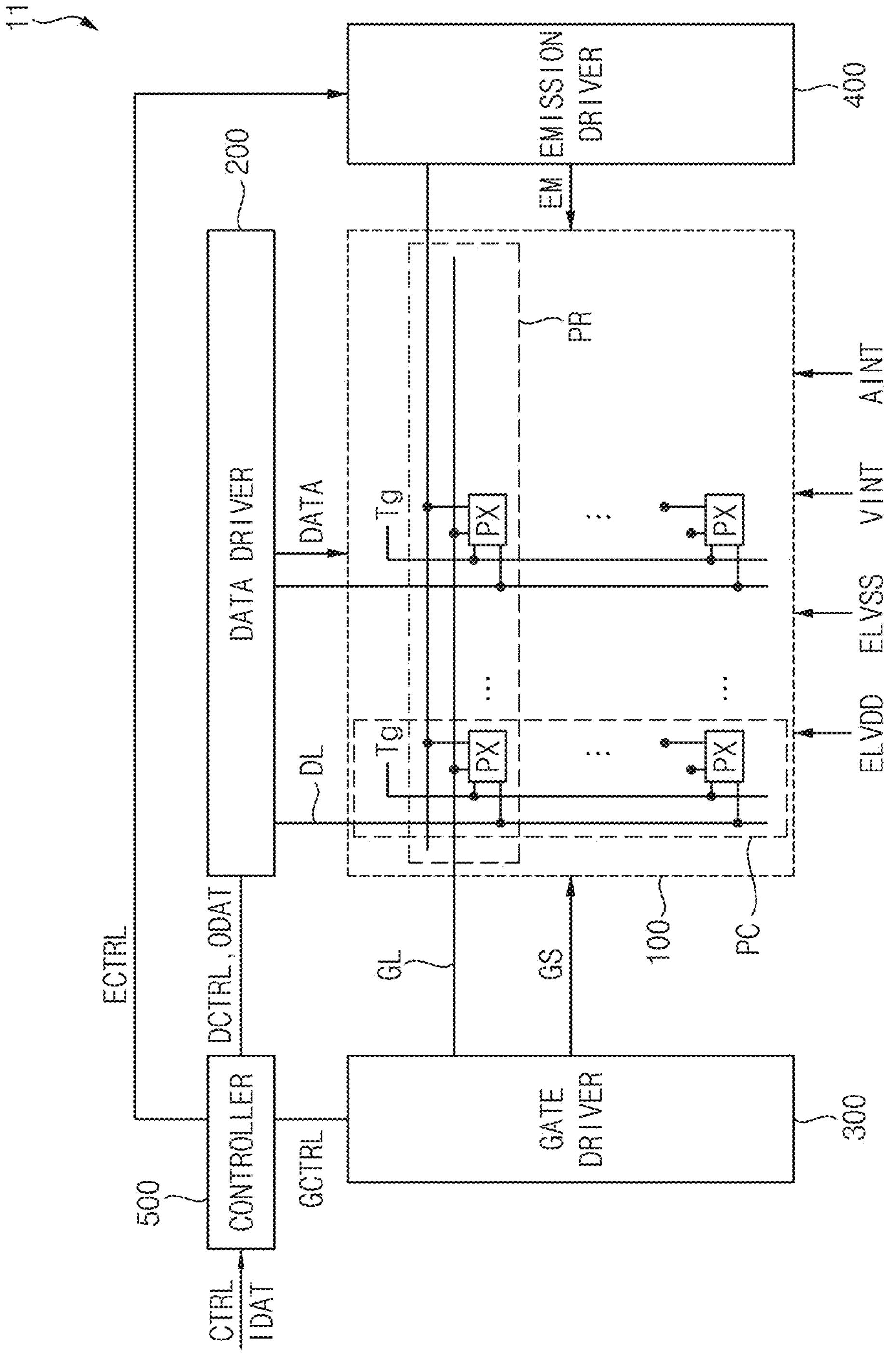
FIG. 18 is a block diagram illustrating a display device according to another embodiment.

FIG. 18 is a block diagram illustrating a display device according to another embodiment.

Referring to FIG. 18, the display device 11 according to another embodiment of the present invention may have a substantially same or similar configuration with the display device 10 of FIG. 1 except that pixel circuits PXC are arranged in a plurality of rows and a plurality of columns, and a global transistor Tg is disposed on each row of the pixel circuits PXC. Therefore, in describing the display device 11 of FIG. 18, a description of a configuration substantially the same as or similar to the display device 10 of FIG. 1 may be omitted.

Referring to FIG. 18, the display device 11 may include a pixel unit 100. The pixel unit 100 may include pixels PX and global transistors Tg. Each of the pixels PX may include a pixel circuit PXC and a light emitting diode LD, and may be connected to the global transistor Tg. Each of the pixel circuits PXC may include a plurality of transistors and at least one capacitor.

The pixels PX may be arranged in a plurality of rows and a plurality of columns. Similarly, the pixel circuits PXC may be arranged in the plurality of rows and the plurality of columns.

The pixel circuits PXC corresponding to one of the plurality of columns may be defined as a pixel circuit column PC. Similarly, the pixel circuits PXC corresponding to one of the plurality of rows may be defined as a pixel circuit row PR. Accordingly, the pixel circuits PXC may be a set of the pixel circuit columns PC that extend in a column direction and are arranged in a row direction. Also, the pixel circuits PXC may be a set of the pixel circuit rows PR that extend in a row direction and are arranged in a column direction.

The pixel circuit column PC may be connected to one data line DL. That is, pixel circuits PXC included in the pixel circuit column PC may be connected to the one data line DL. Accordingly, the pixel circuits PXC included in the pixel circuit column PC may receive the data voltage DATA from the data driving circuit 200.

The pixel circuit row PR may be connected to one gate line GL. That is, pixel circuits PXC included in the pixel circuit row PR may be connected to one gate line GL. Accordingly, the pixel circuits PXC included in the pixel circuit row PR may receive the gate signal GS from the gate driving circuit 300.

In an embodiment, at least one pixel circuit column PC among the pixel circuit columns PC may be electrically connected to the global transistor Tg. That is, the pixel circuits PXC included in the pixel circuit column PC may be electrically connected to the global transistor Tg. Accordingly, the pixel circuits PXC included in the pixel circuit column PC may receive a first voltage (e.g., the first voltage V1 of FIGS. 13 and 14) from the global transistor Tg. In detail, the back-gate terminals BML of the pixel circuits PXC included in the pixel circuit column PC may receive the first voltage.

In an embodiment, one global transistor Tg may be connected to each of the pixel circuit columns PC. However, embodiments according to the present invention are not limited thereto, and in another embodiment, the global transistor Tg may be connected to one for every two or more pixel circuit columns PC.

The pixel circuit and the display device according to the embodiments may be applied to a display device included in a computer, a notebook, a mobile phone, a smartphone, a smart pad, a PMP, a PDA, an MP3 player, or the like.

Although the pixel circuit and the display device according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a substrate;

a driving transistor including an active pattern disposed on the substrate and including a channel region, a gate electrode disposed on the active pattern and overlapping the channel region in a plan view, and a back-gate pattern disposed under the active pattern and overlapping the active pattern in the plan view; and a global transistor which provides a first voltage which decreases from a positive polarity to a negative polarity over a life of the global transistor to the back-gate pattern.

2. The display device of claim 1, wherein the global transistor includes:

a global active pattern including a global source region electrically connected to a voltage supply line which provides a third voltage which has a positive polarity, a global drain region electrically connected to the back-gate pattern, and a global channel region disposed between the global source region and the global drain region; and a global gate electrode disposed on the global active pattern, such that the global gate electrode overlaps the global channel region in the plan view, and receives a second voltage which has a negative polarity.

3. The display device of claim 2, wherein the voltage supply line is a high power voltage line.

4. The display device of claim 2, further comprising:

a light emitting diode electrically connected to the driving transistor and which receives a low power voltage, and wherein the second voltage is the low power voltage.

5. The display device of claim 2, further comprising:

an initialization transistor including an initialization gate terminal which receives an initialization gate signal, an initialization drain terminal electrically connected to the gate electrode of the driving transistor, and an initialization source terminal which receives a transistor initialization voltage, and wherein the second voltage is the transistor initialization voltage.

6. The display device of claim 2, further comprising:

a light emitting diode electrically connected to the driving transistor, and an anode initialization transistor including an anode initialization gate terminal which receives a bypass gate signal, an anode initialization source terminal electrically connected to the light emitting diode, and an anode initialization drain terminal which receives an anode initialization voltage, and wherein the second voltage is the anode initialization voltage.

* * * * *